(12) United States Patent
Cismas et al.

(10) Patent No.: US 7,765,547 B2
(45) Date of Patent: Jul. 27, 2010

(54) HARDWARE MULTITHREADING SYSTEMS WITH STATE REGISTERS HAVING THREAD PROFILING DATA

(75) Inventors: Sorin C. Cismas, Saratoga, CA (US); Ilie Garbacea, Santa Clara, CA (US); Kristan J. Monsen, Los Altos, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1645 days.

(21) Appl. No.: 10/996,691

(22) Filed: Nov. 24, 2004

(65) Prior Publication Data

US 2006/0117316 A1    Jun. 1, 2006

(51) Int. Cl.
*G06F 9/46* (2006.01)
*G06F 9/30* (2006.01)
*G06F 7/38* (2006.01)
*G06F 11/00* (2006.01)

(52) U.S. Cl. ................ 718/100; 718/102; 718/103; 718/107; 718/108; 712/214; 712/228; 714/12

(58) Field of Classification Search ................ 718/100, 718/102, 103, 107, 108; 712/214, 228; 714/12
See application file for complete search history.

(56) References Cited

U.S. PATENT DOCUMENTS

| 5,276,886 | A | 1/1994 | Dror |
| 5,968,167 | A | 10/1999 | Whittaker et al. |
| 6,076,157 | A | 6/2000 | Borkenhagen et al. |
| 6,145,073 | A | 11/2000 | Cismas |
| 6,212,544 | B1 * | 4/2001 | Borkenhagen et al. ...... 718/103 |
| 6,341,347 | B1 | 1/2002 | Joy et al. |

(Continued)

FOREIGN PATENT DOCUMENTS

WO    WO 0045239 A2    8/2000

OTHER PUBLICATIONS

PCT International Search Report and PCT Written Opinion of the International Searching Authority for PCT International Application No. PCT/US2005/042794, International Filing Date Nov. 24, 2005, Priority Date Nov. 24, 2004.

(Continued)

*Primary Examiner*—Meng-Ai An
*Assistant Examiner*—Kenneth Tang
(74) *Attorney, Agent, or Firm*—Law Office of Andrei D. Popovici, P.C.

(57) ABSTRACT

According to some embodiments, a multithreaded microcontroller includes a thread control unit comprising thread control hardware (logic) configured to perform a number of multithreading system calls essentially in real time, e.g. in one or a few clock cycles. System calls can include mutex lock, wait condition, and signal instructions. The thread controller includes a number of thread state, mutex, and condition variable registers used for executing the multithreading system calls. Threads can transition between several states including free, run, ready and wait. The wait state includes interrupt, condition, mutex, I-cache, and memory substates. A thread state transition controller controls thread states, while a thread instructions execution unit executes multithreading system calls and manages thread priorities to avoid priority inversion. A thread scheduler schedules threads according to their priorities. A hardware thread profiler including global, run and wait profiler registers is used to monitor thread performance to facilitate software development.

91 Claims, 16 Drawing Sheets

U.S. PATENT DOCUMENTS

| | | |
|---|---|---|
| 6,438,671 B1 | 8/2002 | Doing et al. |
| 6,499,048 B1 | 12/2002 | Williams |
| 6,507,862 B1 | 1/2003 | Joy et al. |
| 6,542,921 B1 | 4/2003 | Sager |
| 6,594,683 B1 | 7/2003 | Furlani et al. |
| 6,625,654 B1 | 9/2003 | Wolrich et al. |
| 6,629,237 B2 | 9/2003 | Wolrich et al. |
| 2002/0083252 A1* | 6/2002 | Armstrong et al. .......... 710/260 |
| 2004/0078794 A1* | 4/2004 | Burns et al. ................. 718/100 |
| 2005/0166206 A1* | 7/2005 | Parson ....................... 718/104 |
| 2005/0193278 A1* | 9/2005 | Hammarlund et al. ........ 714/47 |

OTHER PUBLICATIONS

IEEE, 1003.1(TM) Standard for Information Technology—Portable Operating System Interface (POSIX® ), System Interfaces, Issue 6, Approved Sep. 12, 2001, pp. cover, ii, vii-xvi, 11-83, 976-1142.

* cited by examiner

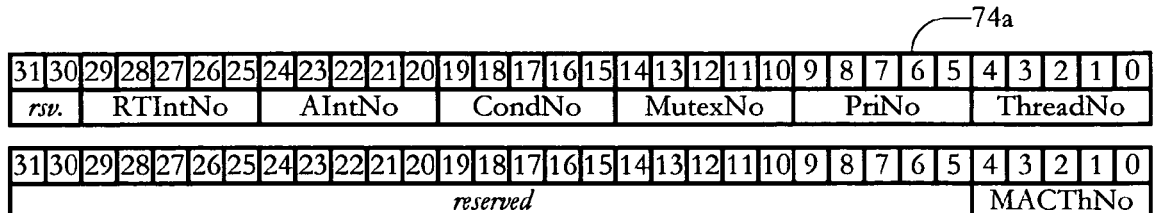
FIG. 5-A
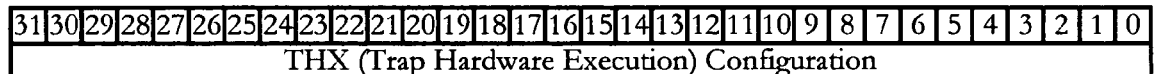
FIG. 5-B
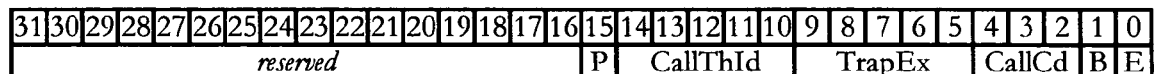
FIG. 5-C
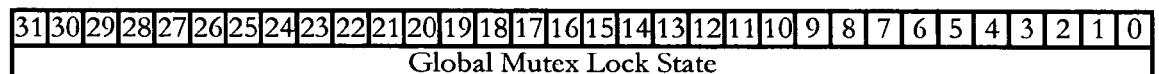
FIG. 5-D
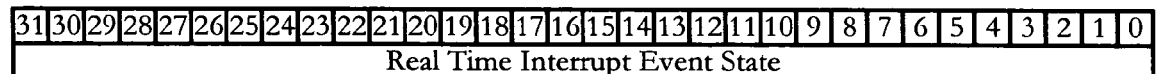
FIG. 5-E
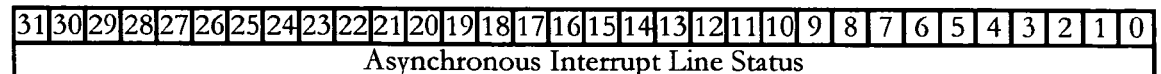
FIG. 5-F

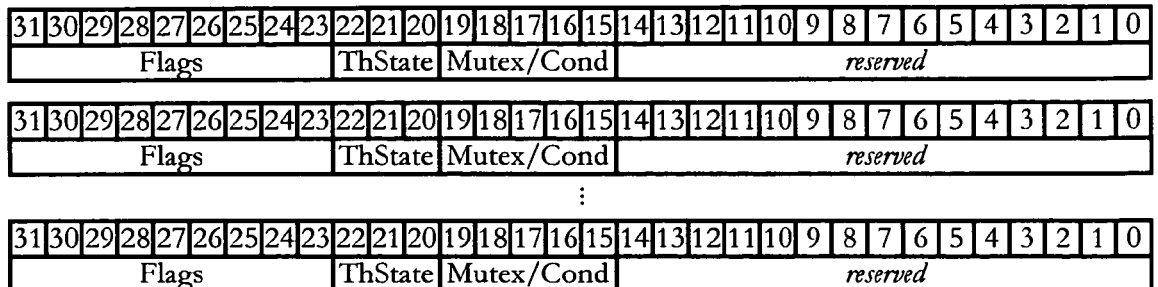
FIG. 6-A
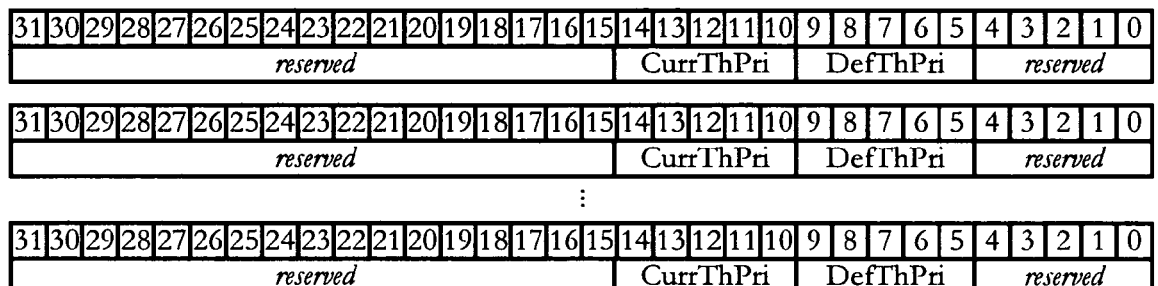
FIG. 6-B
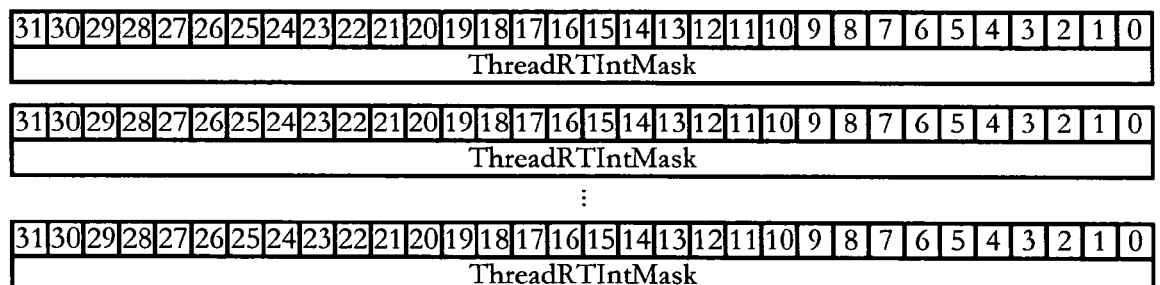
FIG. 6-C
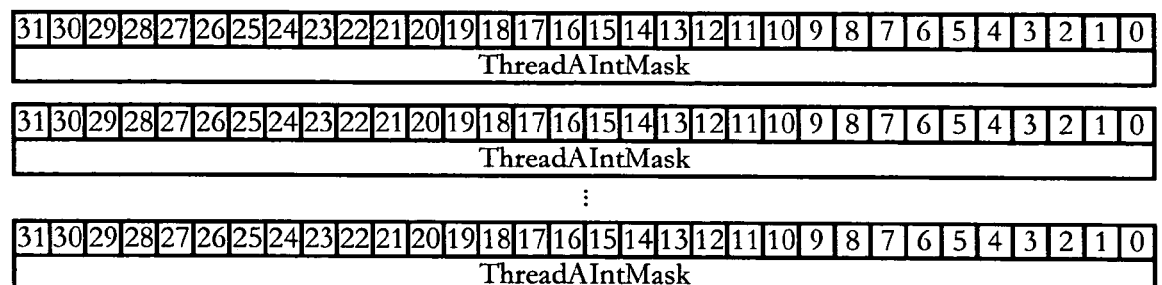
FIG. 6-D

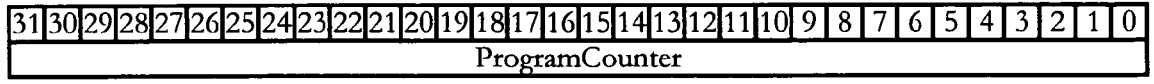
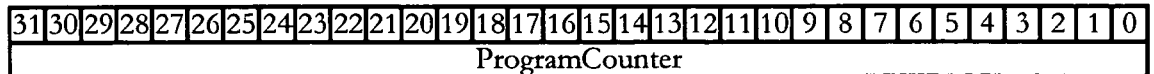
FIG. 6-E                                                                 76e
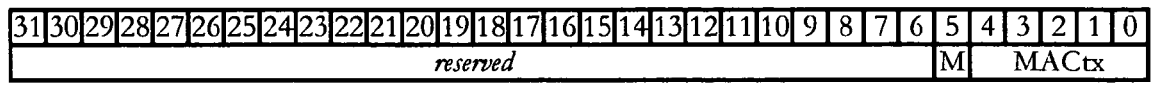
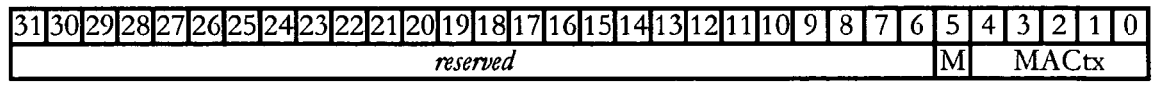
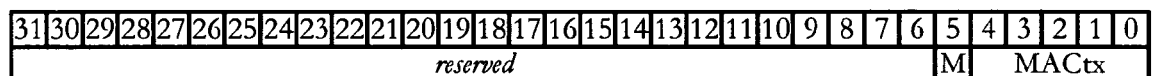
FIG. 6-F                                                                 76f
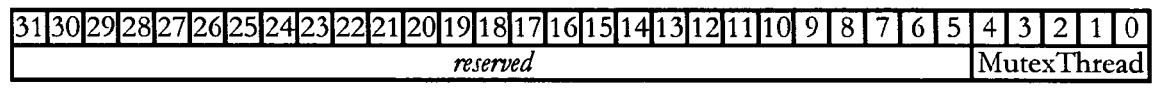
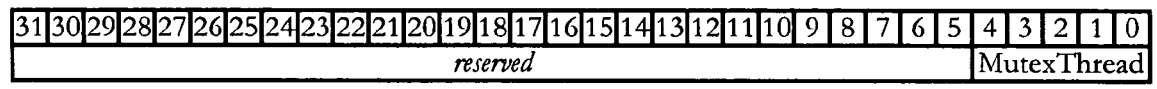
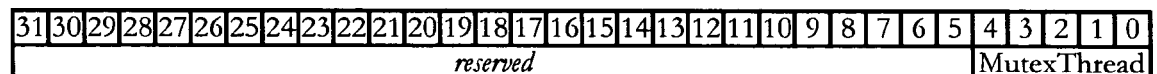
FIG. 7                                                                   80
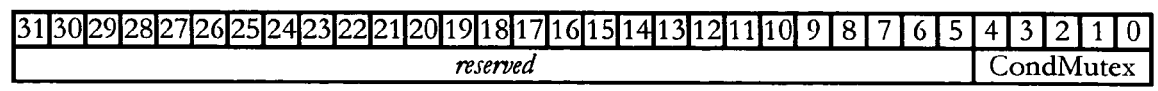
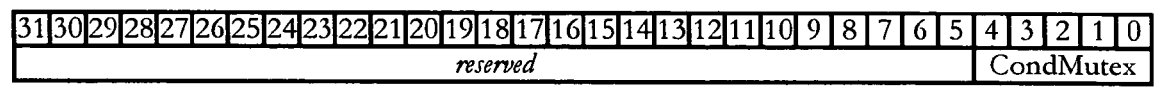
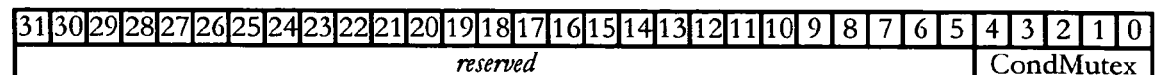
FIG. 8                                                                   82

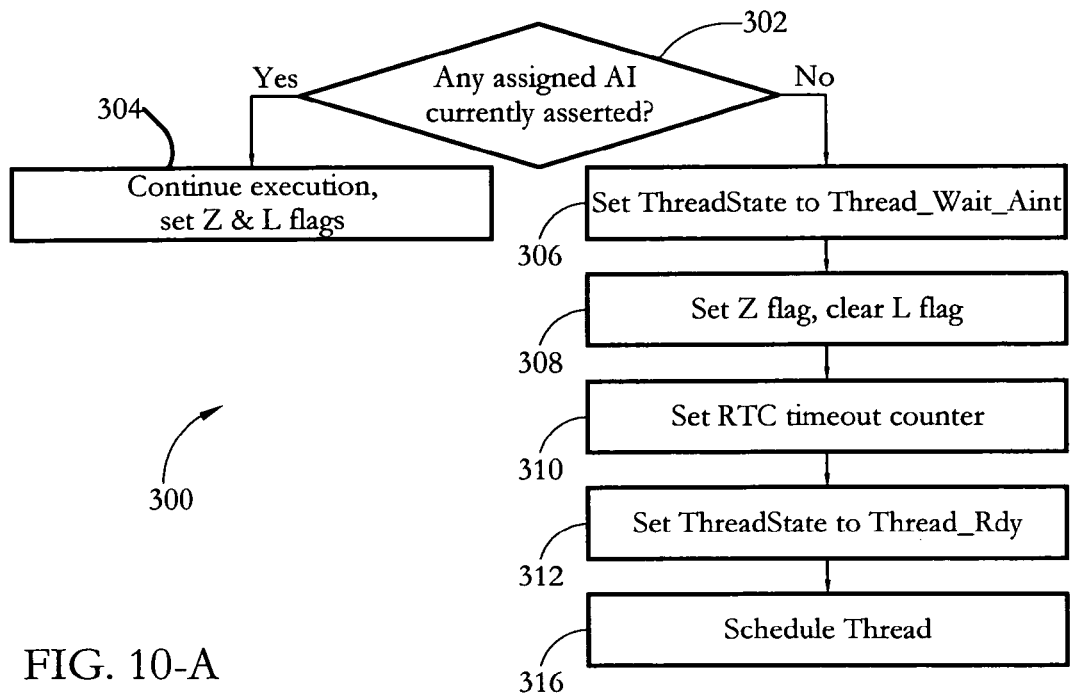
FIG. 10-A
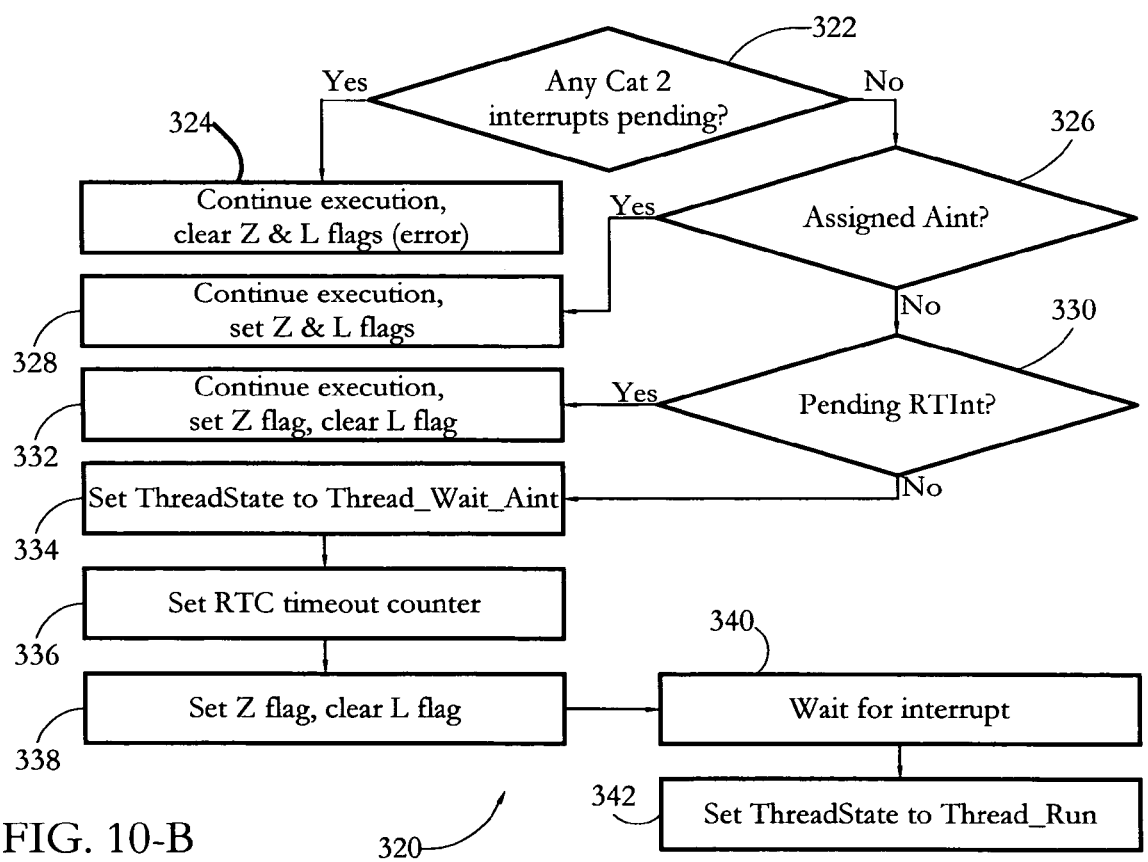
FIG. 10-B

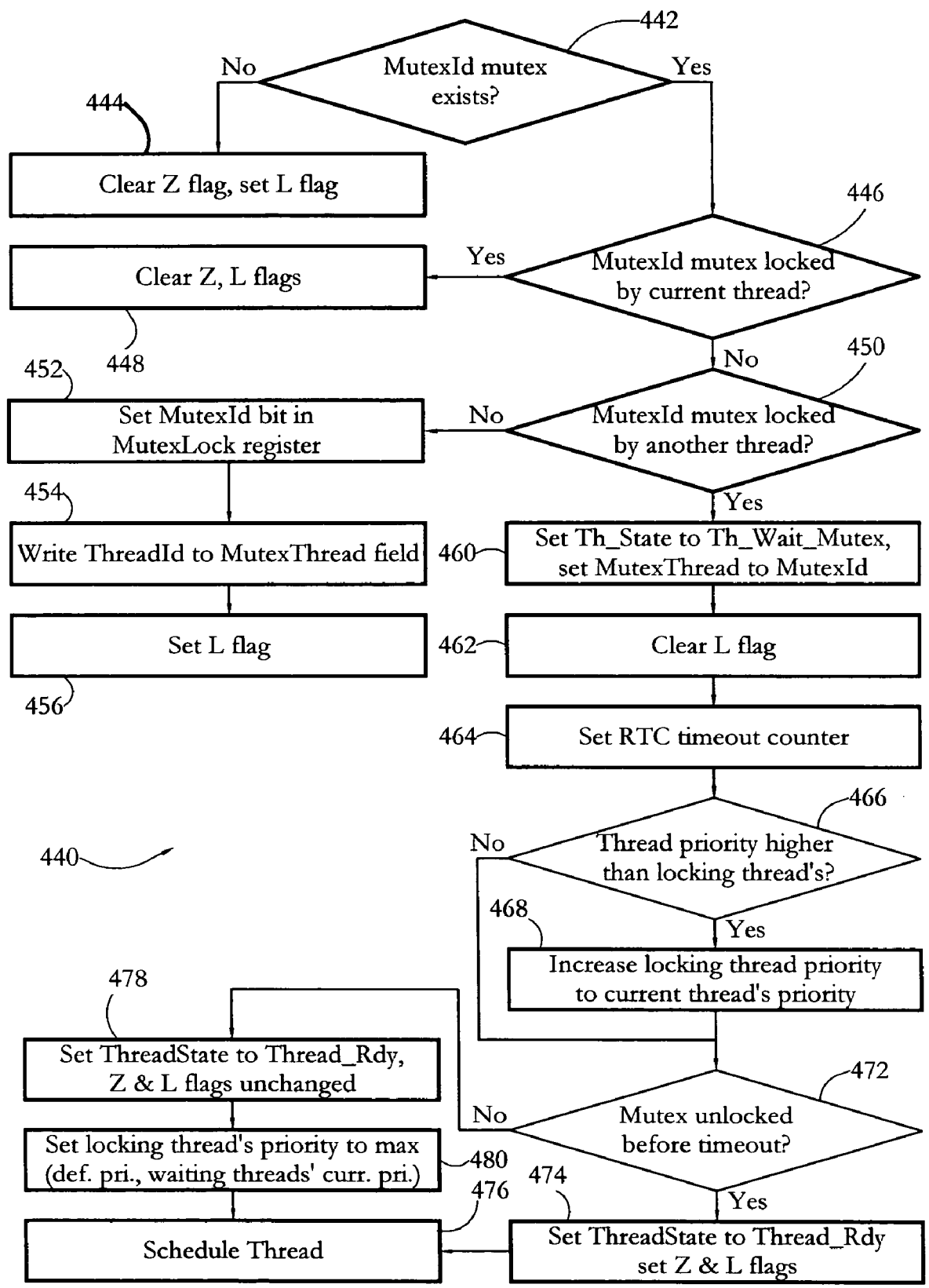
FIG. 13-A

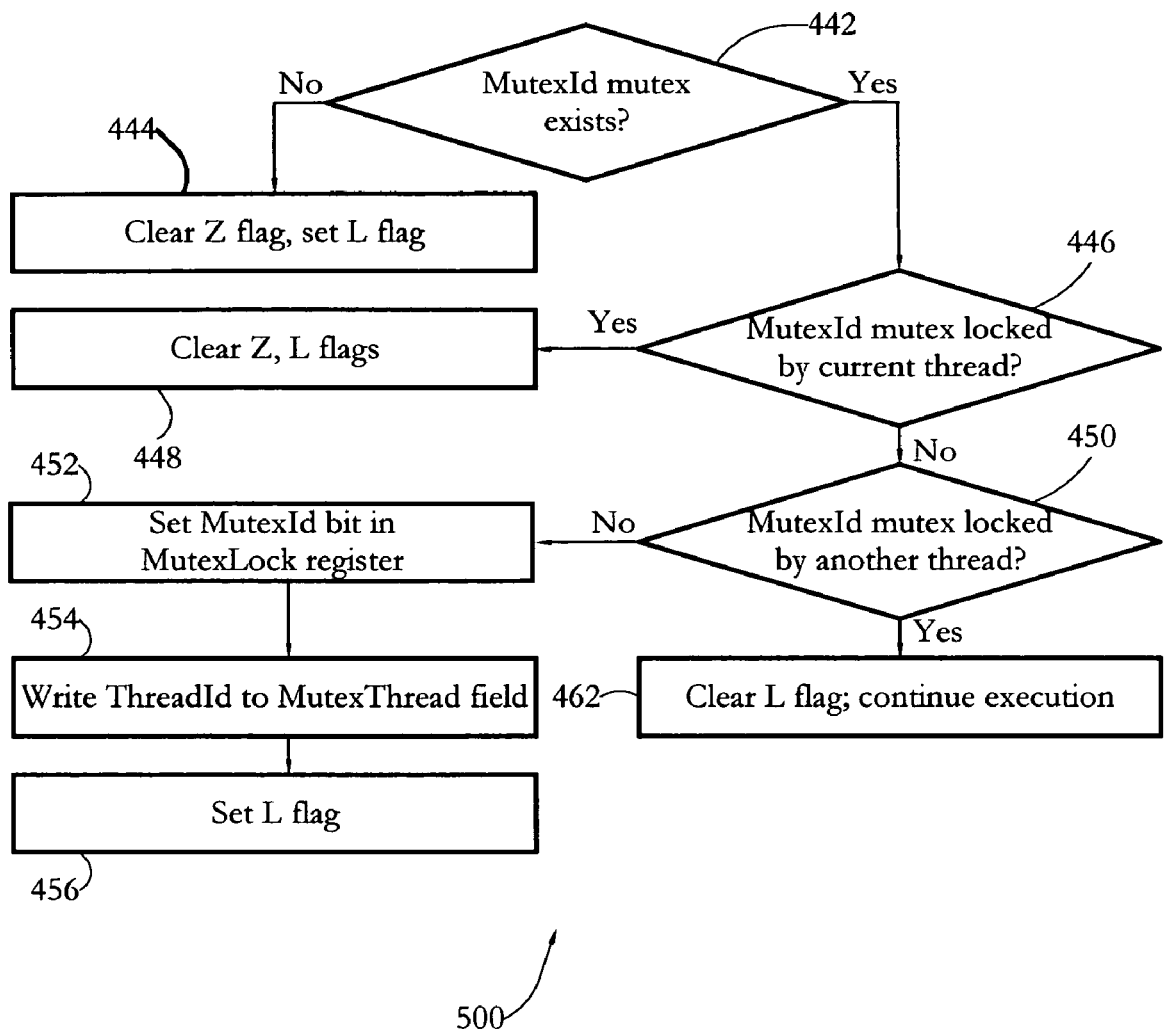
FIG. 13-B

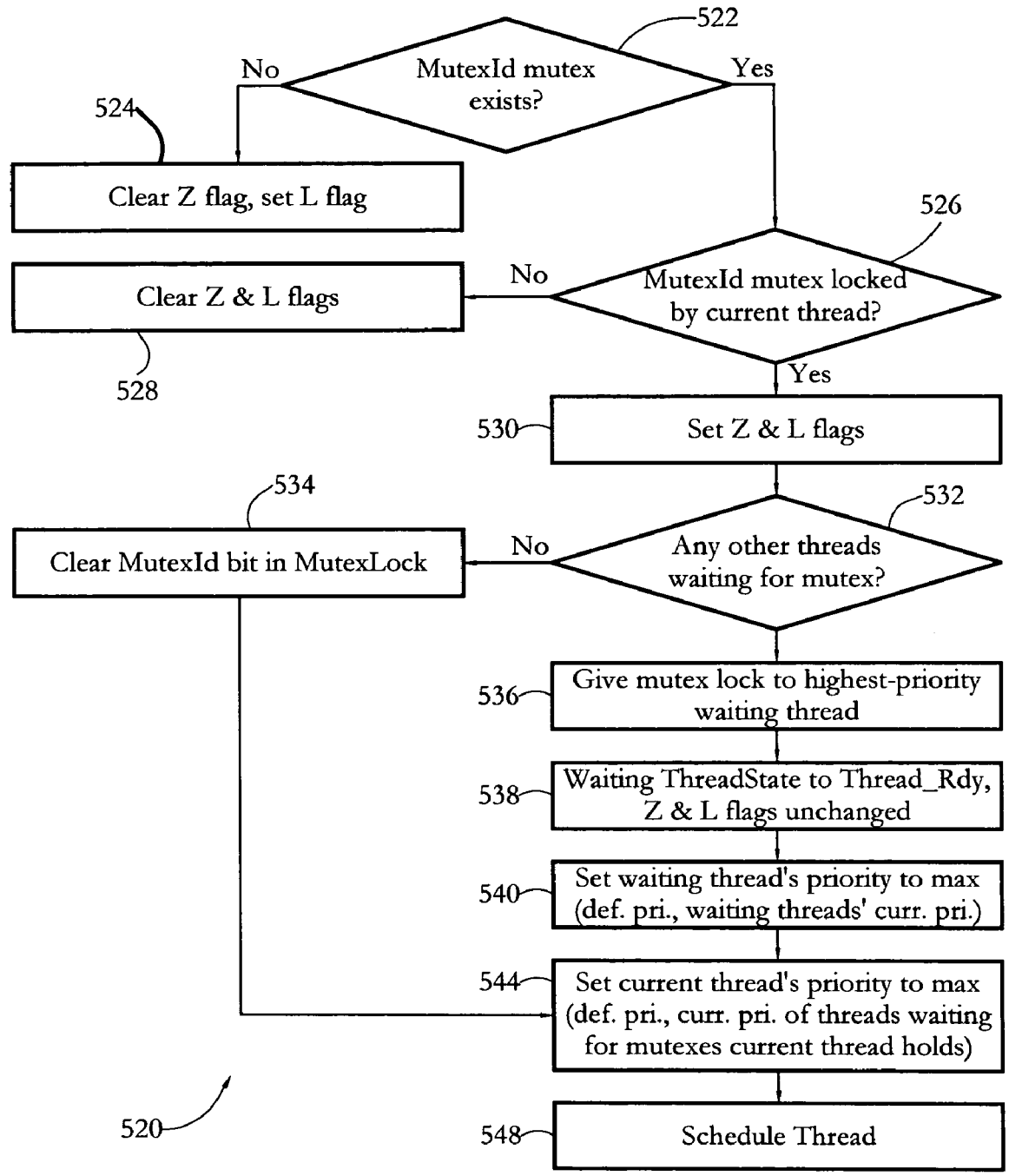
FIG. 13-C

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| *reserved* | | | | | | | | | | TransCtWidth | | | | StateCtWidth | | | | WCtNo | | | | WaitProfNo | | | | RunProfNo | | | | | |

78G-1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GP_Cycles |||||||||||||||||||||||||||||||| 
| GP_SysThdCycles ||||||||||||||||||||||||||||||||

78G-2

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GP_RMissSched ||||||||||||||||||||||||||||||||

FIG. 18-A 78G-3

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RPi_ThdMask ||||||||||||||||||||||||||||||||

78R-1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RPi_Instrs ||||||||||||||||||||||||||||||||
| RPi_RunCycles ||||||||||||||||||||||||||||||||
| RPi_RdyCycles ||||||||||||||||||||||||||||||||

78R-2

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RPi_Run2WIC ||||||||||||||||||||||||||||||||
| RPi_Run2Wmem ||||||||||||||||||||||||||||||||
| RPi_Run2WMtx ||||||||||||||||||||||||||||||||
| RPi_Run2WCond ||||||||||||||||||||||||||||||||
| RPi_Run2WAint ||||||||||||||||||||||||||||||||
| RPi_Run2Rdy ||||||||||||||||||||||||||||||||
| RPi_PriRaises ||||||||||||||||||||||||||||||||

FIG. 18-B 78R-3

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| rsv. | | WPi_WMask4 | | | | WPi_WMask3 | | | | WPi_WMask2 | | | | WPi_WMask1 | | | | WPi_WMask0 | | | | WPi_ThdId | | | | | | | | | |

78W-1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| WPi_WaitCycles0 ||||||||||||||||||||||||||||||||
| WPi_WaitCyclesj ||||||||||||||||||||||||||||||||
| WPi_WaitCycles(WCN-1) ||||||||||||||||||||||||||||||||

HARDWARE MULTITHREADING SYSTEMS WITH STATE REGISTERS HAVING THREAD PROFILING DATA

FIELD OF THE INVENTION

The invention in general relates to data processing systems and methods, and in particular to multithreaded data processing systems and methods.

BACKGROUND

In a multithreaded system, an application or process is subdivided into multiple threads. The central processing unit (CPU) switches rapidly between the different threads, and thus creates the illusion that the threads are running concurrently. Each thread typically has its own program counter, stack and thread state.

Threads often share resources such as memory space. To prevent inter-thread conflicts in accessing a shared resources, multithreaded systems employ murexes, or mutual exclusion objects. A mutex is a shared resource that can be locked or unlocked. A thread locks a mutex, accesses data in the shared space, and unlocks the mutex when the need to access the shared space is over. A second thread must wait for the original thread to unlock the mutex before accessing the share space.

Threads also often need to communicate with one another. For example, one thread may be a consumer of data produced by another thread. The producer thread may need to signal the consumer thread when data is available for the consumer thread. Conversely, the consumer thread may need to signal to the producer thread that the consumer cannot accept any more data. Interthread communication can be achieved using condition variables. A condition variable is employed by a thread to make itself wait until some condition, which may depend on another thread, is met. For example, when a producer thread finds it cannot continue, e.g. if its output buffer is full, the producer thread executes a wait condition instruction and suspends execution. When the condition has been met, e.g. the producer's output buffer is no longer full, another process such as the consumer can wake up the producer thread by executing a signal instruction for the condition variable that the producer is waiting on.

Thread management functions such as mutex lock, wait condition and signal are multithreading system calls. Multithreading system calls are normally relatively complex procedures. In a conventional operating system running on a general-purpose CPU, a high-level language multithreading system call can be translated into a relatively large number (e.g. hundreds or thousands) of machine code instructions.

SUMMARY OF THE INVENTION

According to one aspect, the present invention provides a multithreaded microcontroller comprising a set of special-purpose multithreading registers, and thread control logic connected to the set of multithreading registers. The set of multithreading registers includes a set of thread state registers storing a plurality of thread states for a corresponding plurality of threads. The thread control logic comprises thread state transition logic connected to the set of thread state registers and configured to control thread state transitions for the plurality of threads; and thread instructions execution logic connected to the thread state transition logic and configured to execute a set of multithreading system call machine code instructions. Multithreading system call instructions include wait condition, signal, and mutex lock instructions used for inter-thread communication and thread management.

According to another aspect, the present invention provides a multithreaded microcontroller comprising: an instruction fetching unit, an arithmetic logic unit connected to the instruction fetching unit, and a hardware thread controller connected to the instruction fetching unit and the arithmetic logic unit. The instruction fetching unit is configured to receive a set of machine-code instructions for a plurality of threads. The set of instructions includes a set of arithmetic and logical instructions, and a set of multithreading system call instructions. The arithmetic logic unit is configured to receive and execute the set of arithmetic and logical instructions. The hardware thread controller is configured to receive and execute the set of multithreading system call instructions.

According to another aspect, the present invention provides a data processing system comprising a plurality of special-purpose hardware cores integrated on a chip, and a multithreaded microcontroller integrated on the chip and connected to the plurality of cores. The plurality of cores includes at least one video coding (encoding/decoding) core and at least one audio coding core. The microcontroller controls a plurality of threads including at least one video coding thread and at least one audio coding thread. The multithreaded microcontroller includes a set of special-purpose multithreading registers including a set of thread state registers storing a plurality of thread states for the plurality of threads, and thread control logic connected to the set of multithreading registers. The thread control logic comprises thread state transition logic connected to the set of thread state registers and configured to control thread state transitions for the plurality of threads, and thread instructions execution logic connected to the thread state transition logic and configured to execute a set of multithreading system call machine code instructions.

According to another aspect, the present invention provides a data processing apparatus comprising a multithreaded execution unit configured to run a plurality of threads; and a hardware thread profiler connected to the multithreaded execution unit. The thread profiler comprises thread profiling logic configured to collect thread profiling data for the plurality of threads; and a set of thread profiling registers storing the thread profiling data. The thread profiling data includes a datum selected from a thread state transition count and a time period spent by a thread in a set of thread states.

BRIEF DESCRIPTION OF THE DRAWINGS

The foregoing aspects and advantages of the present invention will become better understood upon reading the following detailed description and upon reference to the drawings where:

FIGS. 5-A-F are diagrams of a number of exemplary global thread registers according to some embodiments of the present invention.

FIGS. 6-A-F are diagrams of a number of exemplary tread-specific registers, each corresponding to a thread, according to some embodiments of the present invention.

FIG. 7 shows a set of exemplary mutex thread lock register, each corresponding to a mutex, according to some embodiments of the present invention.

FIG. 8 shows a set of exemplary condition mutex registers, each corresponding to a condition variable, according to some embodiments of the present invention.

FIG. 10-A shows a sequence of steps performed by the MMU of FIG. 2 to execute an asynchronous interrupt wait (waitint) instruction called by a processing thread, according to some embodiments of the present invention.

FIG. 10-B shows a sequence of steps performed by the MMU of FIG. 2 to execute an asynchronous interrupt wait (waitint) instruction called by the system thread, according to some embodiments of the present invention.

FIGS. 13-A-C show sequences of steps performed during execution of committed lock mutex (lock), test mutex (locktry), and unlock mutex (unlock) instructions, respectively, according to some embodiments of the present invention.

FIGS. 18-A-C show a number of global profiling, run profiling, and wait profiling registers, respectively, according to some embodiments of the present invention.

DETAILED DESCRIPTION OF THE INVENTION

In the following description, it is understood that all recited connections between structures can be direct connections or indirect connections through intermediary structures. A set of elements includes one or more elements. Any recitation of an element is understood to refer to at least one element. The term "logic" refers to special-purpose hardware. A multi-threading system call machine code instruction is understood to be a machine code instruction whose execution results in implementation of the functionality of a multithreading system call. Unless otherwise required, any described method steps need not be necessarily performed in a particular illustrated order. Unless otherwise specified, the term "mutex locking instruction" encompasses committed mutex lock instructions in which a thread suspends its execution on failure to lock a mutex, test mutex instructions in which a thread does not suspend its execution on failure to lock the mutex, and mutex unlock instructions. Unless otherwise specified, the term "register" includes stand-alone complete registers as well as register fields forming part of a complete register; any recited registers can be provided as stand-alone complete registers, or as fields within a larger register.

The following description illustrates embodiments of the invention by way of example and not necessarily by way of limitation.

Figure 1:
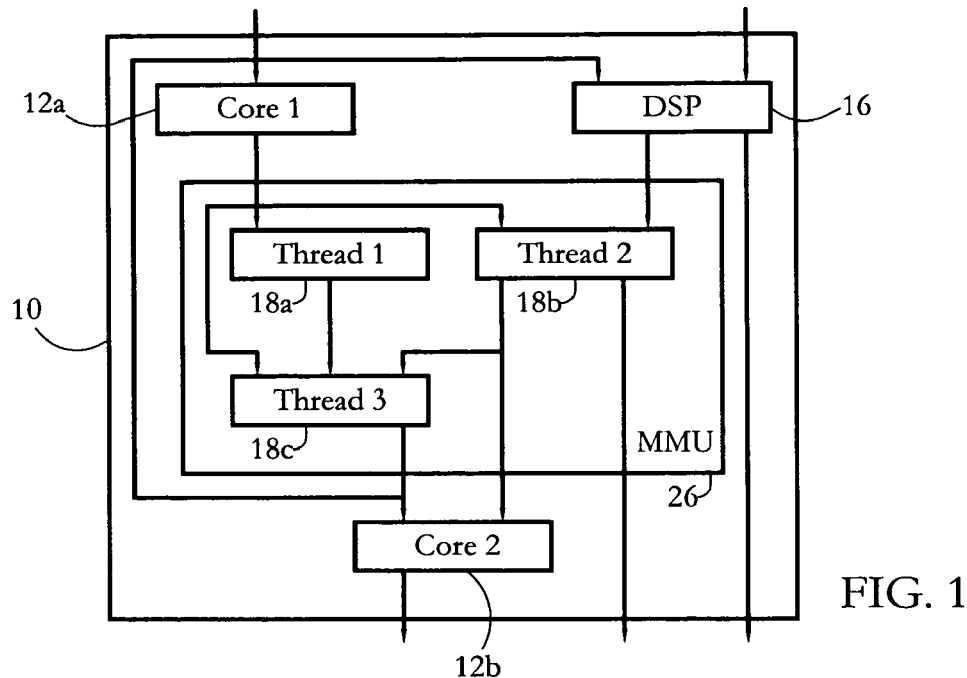
FIG. 1 illustrates schematically an exemplary flow of data through a multi-threaded data processing system according to some embodiments of the present invention.

FIG. 1 illustrates a flow of data through an exemplary data processing system 10 according to an embodiment of the present invention. The configuration of FIG. 1 is shown to illustrate general principles rather than a particular application. The functionality of a process implemented by data processing system 10 is partitioned between a set of special-purpose hardware cores (modules, functional blocks) 12a-b, and one or more software-programmable processors. Two such programmable processors are shown in FIG. 1: a multi-threaded microcontroller unit (MMU) 26, and a digital signal processor (DSP) 16. MMU 26 implements several threads 18a-c, which may form part of one or more software processes. DSP 16 may implement one or more processes (e.g. video processing or audio processing algorithms) in software. Hardware cores 12a-b implement desired functionality in hardware.

In the exemplary data processing system 10 shown in FIG. 1, input data streams are received by cores 12a-b and DSP 16. MMU 26 acts on processing results received from core 12a and DSP 16. Core 12b then further acts on processing results received from MMU 26. In the illustrated configuration, each of core 12b, MMU 26 and DSP 16 generates one of the output data streams of system 10. In some embodiments, MMU 26 may be used to implement a control path (control threads), while dedicated hardware blocks such as cores 12a-b are used to implement a computationally-intensive data path. In some embodiments, cores 12a-b, MMU 26 and/or DSP 16 may be interconnected as described in U.S. Pat. No. 6,145,073, "Data Flow Integrated Circuit Architecture."

The hardware/software partitioning illustrated in FIG. 1 can be generated by partitioning an application into several processes, partitioning each process into threads, and assigning each thread to be implemented either in hardware (e.g. by one of cores 12a-b) or in software (e.g. by MMU 26 or DSP 16). In a video/audio coding (encoding/decoding) application, examples of threads include video, audio, synchronization, buffer control, system demultiplexing, and application threads. The threads run by MMU 26 are able to communicate with each other using a number of mechanisms described in detail below.

Figure 2:
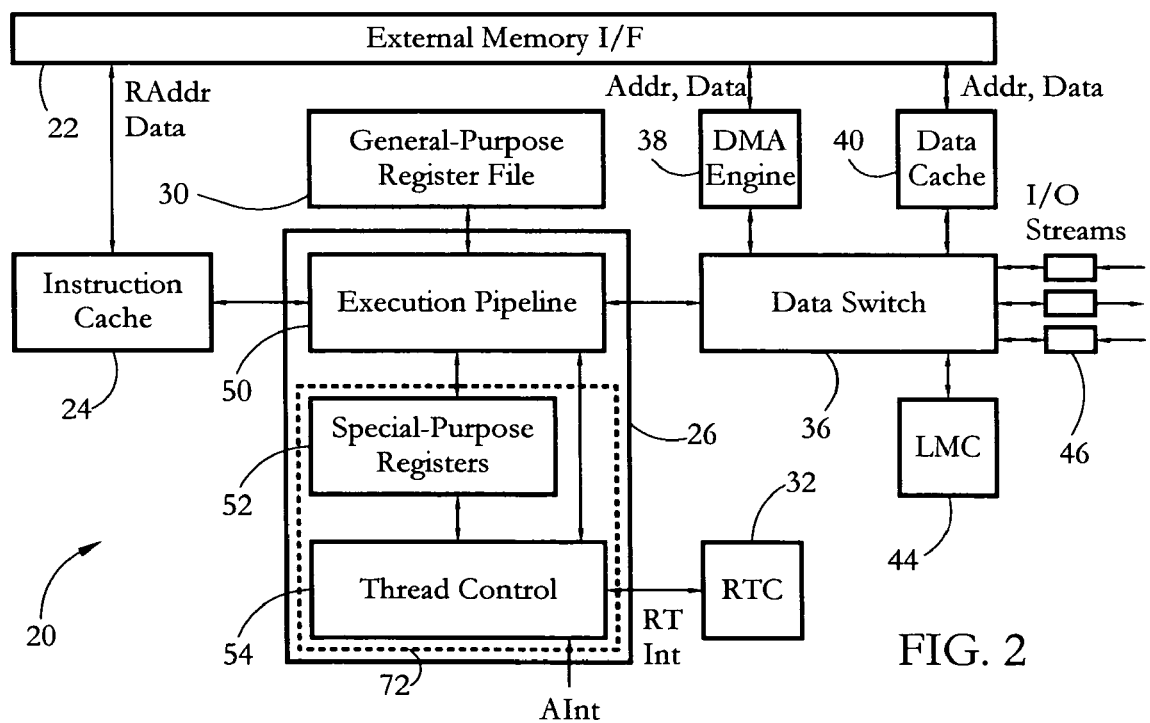
FIG. 2 is a schematic diagram of an exemplary multi-threaded data processing system including a multithreaded microcontroller unit (MMU) according to some embodiments of the present invention.

FIG. 2 shows a schematic illustration of a structure of an exemplary data processing system 20 according to some embodiments of the present invention. The structure of system 20 can be used to implement a data flow such as the one illustrated in FIG. 1. System 20 includes, among others, an external memory interface 22 connected to an external (off-chip) memory, an instruction cache (I-cache) 24 connected to memory interface 22, a multithreaded microcontroller unit (MMU) 26 connected to I-cache 24, a general-purpose register file 30 connected to MMU 26, and a real-time interrupt unit 32 connected to MMU 26. MMU 26 is further connected to a number of other functional blocks of system 20 through a data switch 36. In particular, data switch 36 is connected to a DMA engine 38, a data cache (D-cache) 40, a local memory controller 44, and a plurality of input and output stream controllers 46. Each stream controller 46 controls an input or output data stream. In an exemplary application, such data streams include video and audio data streams. Stream controllers 46 are further connected to one or more special-purpose hardware cores. Data switch 36 can also be connected to one or more special-purpose hardware cores and/or other multithreaded microcontroller units. DMA engine 38 and data cache 40 are further connected to external memory interface 22, while local memory controller 44 is connected to a local memory.

A data processing system such as system 20 can include multiple MMUs 26. A set of such multiple MMUs can be viewed by clients as, and can have the overall functionality of a single global MMU supporting a larger number of threads. In some embodiments, multiple MMUs can be interconnected through data switch 36. In other embodiments, multiple MMUs can be interconnected through memory or using a daisy-chain link design.

General-purpose register file 30 includes a plurality of register sets, each register set corresponding to one of a plurality of threads. In some embodiments, each general-purpose register set includes: an accumulator, an alternate accumulator, return value registers, argument registers, temporary registers not preserved across function calls, saved registers preserved across function calls, base registers that can be used for indexed load and store instructions, and a return address register used by call instructions to save the address of the instruction following the call. One of the base registers can be used as a stack pointer. In some embodiments, a number of multithreading system calls described below take arguments and return values in one or more of the argument registers.

MMU 26 includes an execution pipeline 50, a set of special-purpose multithreading registers 52, and a thread controller 54. Thread controller 54 and special-purpose registers 52 can be thought to form a thread control unit 72; special-purpose registers can also be thought to form part of thread controller 54. Execution pipeline 50 is connected to I-cache 24, data switch 36, and general-purpose register file 30. Special-purpose registers 52 are connected to execution pipeline 50 and thread controller 54. Thread controller 54 is connected to execution pipeline 50, special-purpose registers 52, and real-time interrupt unit 32.

During the operation of data processing system 20, a set of machine-code instructions is fetched sequentially from memory interface 22 to I-cache 24, and on to execution pipeline 50. The set of machine-code instructions can be a RISC (reduced instruction set computer) instruction set including load, store and direct memory access (DMA) instructions, among others. The set of machine-code instructions also includes a set of multithreading system call instructions described in detail below. Such multithreading system call machine-code instructions include instructions such as mutex (mutual exclusion) and condition variable instructions. Mutex instructions serve to control the access of different threads to shared resources (mutexes). Condition variable instructions condition the execution of one thread on other threads' performance.

Execution pipeline 50 executes most fetched instructions directly, as described below with reference to FIG. 3. Executing conventional machine-code instructions can include loading data from external memory into general purpose register file 30, storing data from general-purpose register file 30 into external memory, performing arithmetic and logical operations on data using one or more arithmetic logic units (ALUs), and establishing direct memory access (DMA) connections between external functional blocks and memory through DMA engine 38. In some embodiments, some multithreading system call instructions can be implemented in software using a system thread described below, while others are executed in hardware using thread controller 54. Thread controller 54 executes multithreading system call instructions, and generally manages thread states and thread state transitions. Thread controller 54 comprises logic configured to perform at least some multithreading system call instructions essentially in real time, in one or a few clock cycles. Preferably, thread controller 54 supports a system thread having special privileges, and a plurality of processing (application) threads. The system thread is used to execute some system calls and service exceptions, signals, and interrupts not explicitly assigned to other threads.

Data switch 36 transfers data to/from the various functional blocks connected to data switch 36: MMU 26, DMA engine 38, data cache 40, LMC 44 and stream controllers 46. In particular, MMU 26 accesses external memory interface 22 through data switch 36. In some embodiments, data switch 36 supports read and write operations concurrently with several DMA operations. DMA engine 38 acts as an external memory DMA controller, and supports DMA transfers to/from external memory. LMC 44 controls a local memory used for local storage, and supports read, write, and DMA operations for the local memory. Each stream controller 46 controls a corresponding input or output data stream. In some embodiments, each stream controller 46 is viewed by MMU 26 effectively as a memory address range. In some embodiments, stream controllers 46 can be instructed to scan their corresponding bit streams for particular bit sequences (e.g. sequences that would interrupt a DMA transfer), and to report status information to MMU 26.

Figure 3:
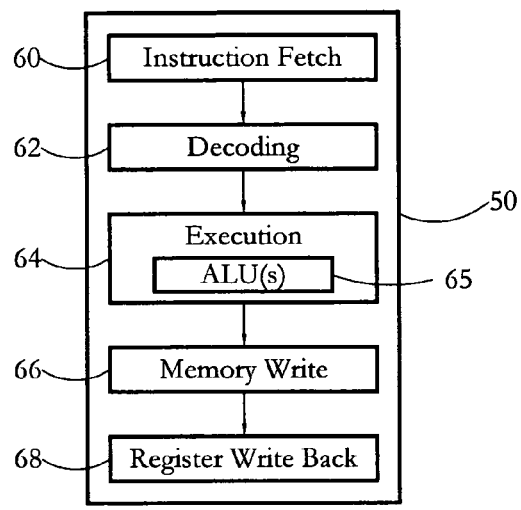
FIG. 3 shows an exemplary execution pipeline of the MMU of FIG. 2, according to some embodiments of the present invention.

FIG. 3 shows a schematic diagram of execution pipeline 50 according to some embodiments of the present invention. Execution pipeline 50 includes a plurality of stages or units connected in sequence: an instruction fetching stage 60, an instruction decoding stage 62, an execution stage 64, a memory write stage 66, and a register write back stage 68. Instruction fetching stage 60 fetches a new instruction from I-cache 24 (shown in FIG. 2). Execution stage 64 includes one or more arithmetic logic units (ALUs) 65. ALU(s) 65 are capable of executing arithmetic, logical, multiply, clip, and bit manipulation instructions such as bitwise AND, OR, add, subtract, multiply, and shift-left, among others. If the instruction fetching fails, instruction fetching stage 60 transmits an I-cache miss signal to thread controller 54. The instruction is communicated to instruction decoding stage 62 (shown in FIG. 3). Instruction decoding stage 62 decodes the instruction, and transmits the decoding results to execution stage 64. Execution stage 64 executes the instruction itself, or, for instructions such as hardware-supported multithreading system calls, directs the execution of the instruction by an external functional block such as thread controller 54 (shown in FIG. 2). Hardware supported multithreading system calls can also be sent directly from decoding stage 62 to thread controller 54. Execution stage 64 transmits the execution results to memory write stage 66, which writes the execution results to memory. If the memory write fails, memory write stage 66 transmits a D-cache miss signal to thread controller 54. Register write back stage 68 updates the contents of general-purpose register file 30 (shown in FIG. 2).

Figure 4:
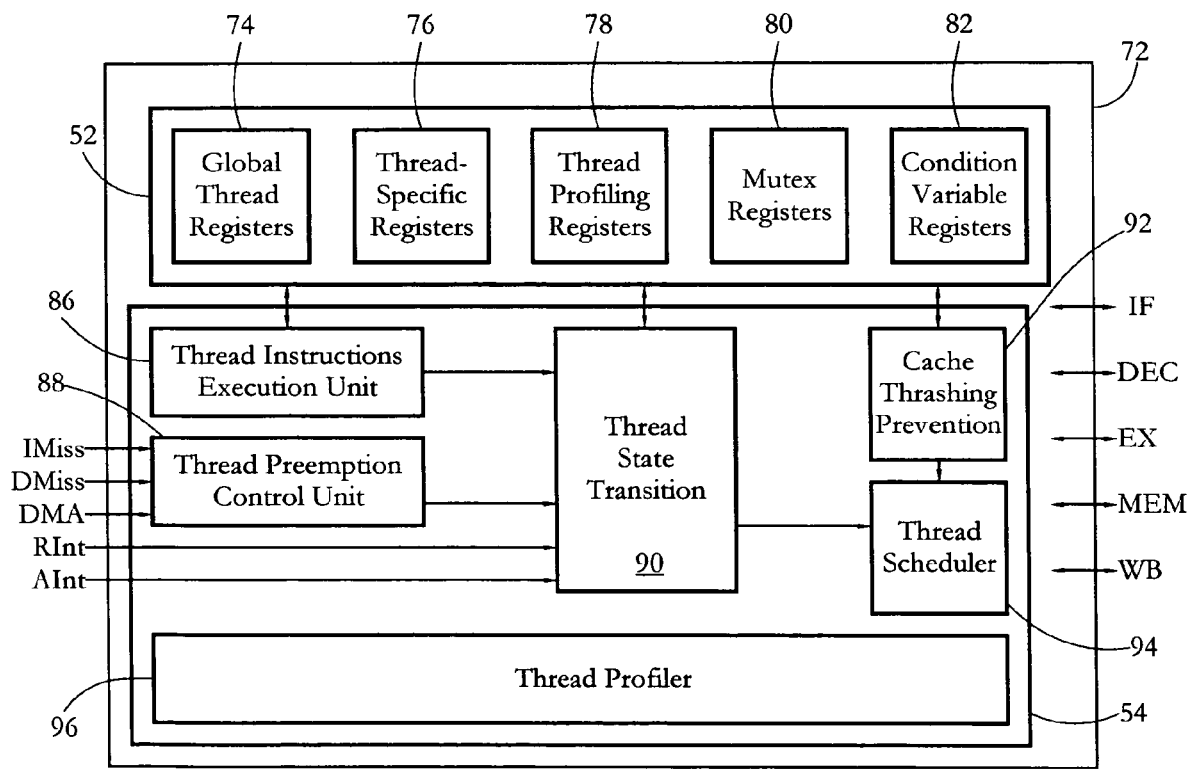
FIG. 4 shows an internal structure of a thread controller of the MMU of FIG. 2, according to some embodiments of the present invention.

FIG. 4 shows a schematic diagram of the structure of a control unit 72 formed by thread controller 54 and special-purpose registers 52, according to some embodiments of the present invention. Special purpose registers 52 contain the complete thread state information needed to execute multithreading system calls and switch threads. Thread controller 54 can access the thread state information needed for thread switches locally, in special-purpose registers 52, rather than in external memory. Thread controller 54 includes a thread instructions execution unit 86, a thread preemption control unit 88, a thread state transition controller 90, a cache thrashing prevention unit 92, a thread scheduler 94, and a hardware thread profiler 96. Thread instructions execution unit 86, thread state transition controller 90, and cache thrashing prevention unit 92 are connected to special-purpose registers 52, and are capable of retrieving and/or updating thread state data to/from special-purpose registers 52. The execution pipeline stages shown in FIG. 3 are capable of communicating with various functional blocks of thread controller 54, as illustrated by the arrows marked IF, DEC, EX, MEM, and WB in FIG. 4. Thread profiler 96 is connected to special-purpose registers 52 and the other functional blocks of thread controller 54.

Thread instructions execution unit 86 includes special-purpose hardware (logic) configured to receive and execute multithreading system calls such as mutex lock and condition variable instructions, as described in detail below. In some embodiments, such multithreading system calls include Wait Interrupt (waitint), Wait Condition (waitcond), Signal (signal), Signal Broadcast (signalbc), and Mutex Lock and Unlock instructions (lock, trylock and unlock). Multithreading system calls are received from the decoding (DEC) stage 62 shown in FIG. 3. In some embodiments, thread instruction execution unit 86 also executes real-time interrupt (rti), asynchronous interrupt (asi), and profiling on/off (profon, profoff) instructions. Thread instructions execution unit 86 transmits to thread state transition controller 90 signals identifying thread state transitions to be performed by thread state transition controller 90. Thread instructions execution unit 86 sends to thread state transition controller 90 a signal specifying that a particular thread is to be transitioned to a particular thread state: for example, thread #12 is to transition to a Thread_Wait_Mutex state described below. Thread instruction execution unit 86 also assigns thread priorities, and updates thread priority data maintained in special-purpose registers 52.

Thread preemption control unit 88 receives an identifier of the currently executing instruction from thread instructions execution unit 86, and receives instruction miss, data miss, and DMA signals from instruction fetch stage 60, memory write stage 64, and decoding stage 62, respectively. Thread preemption control unit 88 includes preemption control logic configured to generate and transmit to thread state transition controller 90 thread preemption control signals indicating that certain thread transitions are to be preempted. When preempted, a processing thread yields to the system thread or to another processing thread. In some embodiments, a processing thread yields to the system thread when the processing thread causes an exception, upon execution of a trap instruction, when a real-time interrupt or asynchronous interrupt assigned to the system thread is received, when an unassigned asynchronous interrupt, hardware soft-reset or non-maskable interrupt is received, or when a debug module signals a breakpoint. In some embodiments, a processing thread yields to another processing thread when suspended by an I-cache or memory stall, upon execution of a DMA instruction, upon execution of a mutex lock instruction for a mutex locked by another thread, upon execution of a wait instruction when the wait event is not available, or when a higher-priority thread is in a Thread_Rdy state described below.

Cache thrashing prevention unit 92 includes logic configured to detect cache thrashing, and, if cache thrashing is detected, to force a thread priority to a high-level and block other (lower priority) threads. Cache thrashing occurs when the cache miss rate becomes too high, such that the cache spends an undesirably high amount of time servicing cache misses. Cache thrashing can occur when frequently-accessed data occupies more space than is available in the cache for that data. For example, if two or more threads use the same location in the cache and frequently alternate writes to that location, the system may exhibit frequent thread preemption or even deadlock.

Thread scheduler 94 includes scheduling logic configured to access thread state and priority data stored in special-purpose registers 52, and transmit to execution pipeline 50 signals indicative of which thread is to be executed (e.g. which thread has a current highest priority). In some embodiments, a scheduling process performed by thread scheduler 94 includes checking which threads are in the Thread_Rdy state; selecting the Thread_Rdy thread with the highest priority (e.g. the thread with a lowest priority number); comparing the selected thread's priority with the priority of the thread currently executing (the thread whose state is Thread_Run), if any; and selecting the thread with the highest priority for execution. Thread scheduler 94 monitors the state of ThState and CurrThPri fields (described below) of special-purpose registers 52, and maintains a NextThreadId register field with the next thread to be scheduled. The NextThreadId register provides a caching mechanism which facilitates performing one scheduling operation per clock cycle.

Thread profiler 96 (shown in FIG. 4) includes thread profiling logic configured to receive thread monitoring data from various functional blocks of MMU 26. Thread monitoring data can include thread transition statistics and other multithreading performance characteristics of potential use during software development. Thread profiler 96 is useful for optimizing the software running on MMU 26.

In some embodiments, special-purpose registers 52 include a set of global thread registers 74, a set of thread-specific registers 76, a set of thread profiling registers 78, a set of mutex (mutual-exclusion) registers 80, and a set of condition variable registers 82. These registers are memory-mapped and made available through load instructions to all threads. In some embodiments, the register contents can be altered by the system thread and thread controller 54, but not by processing threads. A store executed to special-purpose registers 52 by a processing thread results in an exception.

Table 1 lists a number of configuration parameters for special-purpose registers 52 and associated value ranges for the configuration parameters, for an exemplary 32-bit architecture according to some embodiments of the present invention. The configuration parameters of Table 1 determine associated numbers of thread, mutex, and condition variable registers, among others. The configuration parameters of Table 1 can be better understood by considering the detailed description of special-purpose registers 52 below.

TABLE 1

| Parameter | Range | Description |
|---|---|---|
| TN | 1-32 | Thread Number |
| PN | TN-32 | Priority Number |
| MN | 0-32 | Mutex Number |
| CVN | 0-32 | Condition Variable Number |
| AIN | 0-32 | Asynchronous Interrupts Number |
| RTIN | 0-32 | Real-Time Interrupts Number |
| AW | 32 | Address Width (Maximum Addressable Memory) |
| DW | 32 | Data Width |
| THXR | 32-bit mask | Trap Hardware-Execution Mask (Reset value) |

In some embodiments, global thread registers 74 include a set of configuration registers, a trap hardware execution (THX) register, a main state register, a mutex lock register, a real-time interrupt state register, and an asynchronous interrupt state register. FIG. 5-A shows an exemplary set of two configuration registers 74a-a' according to some embodiments of the present invention. The upper rows in the following register diagrams list bit numbers (0-31 for 32-bit registers), while the lower rows list exemplary register contents or field names. Configuration registers 74a-a' include fields specifying parameters including maximum supported numbers of threads (ThreadNo), thread priorities (PriNo), mutexes (MutexNo), condition variables (CondNo), real-time interrupts (RTIntNo), asynchronous interrupts (AIntNo), and hardware threads supported by a MAC (Multiply-Accumulate) unit (MACThNo). In some embodiments, the configuration parameters described above are set as synthesis parameters during the design of MMU 26.

Another configuration parameter can include a trap hardware execution mask, which identifies which of a number of trap instructions are supported in hardware by thread controller 54. The trap hardware execution mask serves as a reset value for a thread hardware execution (THX) register described below. FIG. 5-B shows an exemplary thread hardware execution (THX) register 74b according to some embodiments of the present invention. THX register 74b configures which of a number of trap instructions described below are to be executed in hardware by thread controller 54 (FIG. 2), and which are to be executed in software by the system thread. For example, a bit set to 1 indicates that the corresponding trap instruction has hardware support in thread controller 54. At reset, THX register 74 is initialized to the trap hardware execution mask synthesis parameter, so that all hardware-supported trap instructions are executed by thread controller 54. Subsequently, the system thread can set THX bits from 1 to 0 if it is desired to implement particular instructions in software, and re-set the bits to 1 to return execution of the instructions to thread controller 54.

FIG. 5-C shows an exemplary MMU main state register 74c according to some embodiments of the present invention. Main state register 74c includes an error field E (Err), a branch delay field B (BD), a call code field CallCd, a trap/exception code field TrapEx, a call thread ID field CallThId, and a profiling flag P. The error field E is set when the system thread causes an exception. The call code field CallCd is set and used on entry to the system thread, and indicates the reason why the system thread was activated (e.g. soft reset, debug breakpoint, exception, trap type, or interrupt type). The trap/exception code field TrapEx is updated whenever the call code field CallCd is written. If the call code field is written because of a trap, the TrapEx field identifies the trap code. If the call code field is written because of an exception, the TrapEx field identifies the type of exception. The branch delay field B is also updated whenever the call code field CallCd is written. The branch delay field flag is set when a processing (non-system) thread causes an exception in a branch delay slot or when a breakpoint is signaled on a branch delay slot. The call thread ID field CallThId is the ID of the thread that caused the entry to the system thread via a trap or exception. The call thread ID field CallThId is updated when the call code field CallCd is written. If the system thread was invoked for an interrupt, the call thread ID field CallThId indicates which thread executed the latest instruction. The profiling thread P is set and cleared by software. Reserved (unused) bits are ignored (masked off) for loads performed for main state register 74c.

FIG. 5-D shows an exemplary global mutex lock register 74d according to some embodiments of the present invention. Mutex lock register 74d identifies which mutexes are currently locked. For example, each bit of mutex lock register 74d corresponds to a given mutex, and the bit is set to a given value when the given mutex becomes locked. FIG. 5-E shows an exemplary real-time interrupt event register 74e according to some embodiments of the present invention. Real-time interrupt event register 74e records only real-time interrupt events assigned to the system thread, by setting a bit corresponding to a real-time interrupt if that real-time interrupt is assigned to the system thread. FIG. 5-F shows an exemplary asynchronous interrupt state register 74f according to some embodiments of the present invention. Asynchronous interrupt state register 74f indicates the current state of the asynchronous interrupt lines.

In some embodiments, thread-specific registers 76 include a plurality of registers groups, each corresponding to a thread, with each register group including a thread status register, a thread priority register, a real-time interrupt mask, an asynchronous interrupt mask, a program counter, and a multiply-accumulate context.

FIG. 6-A shows a set of exemplary thread status registers 76a, each corresponding to a unique thread, according to some embodiments of the present invention. Each register 76a has a mutex/condition field Mutex/Cond, a thread state field ThState, and a set of flag fields denoted in FIG. 6-A as Flags. Exemplary flags include carry, negative, overflow, zero condition, carry arithmetic, signed arithmetic, and fixed-point arithmetic. The flags are used to modulate the execution of various instructions (e.g. add, subtract, jump) by execution pipeline 50 (FIG. 2). For example, in a system using 16-bit instructions and having a limited number of opcodes, the same opcode can be used for signed and unsigned instructions, and a signed arithmetic (SA) flag in thread status registers 76a is used to distinguish between signed and unsigned arithmetic operations. The flags can include flags that are set and cleared by explicit instructions (e.g. the mode flags carry arithmetic, signed arithmetic, and fixed-point arithmetic), and flags set indirectly during instruction execution (e.g. the carry, negative, overflow, and zero condition flags).

Two particular flags of interest set in a number of multithreading system call instructions described below include a Zero-Condition flag Z, and a derived flag L=SA?(N$\hat{O}$V):C (meaning "less than"), wherein SA is a Signed Arithmetic flag, N is a Negative flag, V is an oVerflow flag, and C is a Carry flag. The symbol "$\hat{0}$" denotes the exclusive OR (XOR) operator, while the symbols "?" and ":" denote a ternary operator x=a?b:c, which takes on the value x=b if a=TRUE, and x=c otherwise. For unsigned operations, the derived flag L is equal to the Carry flag C. For signed operations, the derived flag L is the exclusive-OR of the Negative flag N and overflow flag V; for signed numbers, the L flag indicates which of two numbers is lower. The derived flag L is set and cleared indirectly, by appropriately setting the SA, N, V, and/or C flags. Setting the L flag to X is achieved by setting the C and V flags to X and the N flag to 0.

The Z and L flags are return values for several multithreading system call instructions described below, and a returned (Z, L) pair indicates the status of the instruction execution (e.g. success, or type of error). Each multithreading system call instruction is followed by a conditional jump instruction having an argument set depending on one or both of the Z and L flags: the jump instruction is performed or not performed depending on the values of one or both of the Z and L flags. The conditional jump instruction is used to commence execution of an error-handling or other responsive subroutine if the multithreading system call encounters an error or other condition, as indicated by the Z and/or L flags. In some embodiments, a set of conditional jump instructions includes a jump-if-less (jlt) instruction causing a jump to an argument-derived address if L (i.e. if L≠0); a jump-if-greater-or equal (jge) instruction causing a jump if !L (i.e if L=0); a jump-if-lessor-equal (jle) instruction causing a jump if (L|Z); a jump-if-greater (jgt) instruction causing a jump if !(L|Z); a jump-if-zero (jz) instruction causing a jump if Z; and a jump-if-non-zero (jnz) instruction causing a jump if !Z.

Thread state field ThState reflects the current state of the thread corresponding to the register. Table 2 shows an exemplary listing of bit representations for a number of potential thread states discussed in more detail below with reference to FIG. 9.

TABLE 2

| State | Description |
|---|---|
| 000: Thread_Free | Thread is not in use |
| 001: Thread_Wait_ICache | Thread is blocked; waiting for ICache |
| 010: Thread_Wait_Memory | Thread is blocked; waiting for memory |
| 011: Thread_Wait_Mutex | Thread is blocked; waiting for a mutex |
| 100: Thread_Wait_Cond | Thread is blocked; waiting for a condition variable |
| 101: Thread_Wait_Aint | Thread is blocked; waiting for an asynchronous interrupt |
| 110: Thread_Rdy | Thread is ready to run, waiting to be scheduled |
| 111: Thread_Run | Thread is running |

If a thread's state is Thread_Wait_Mutex, the mutex/condition field Mutex/Cond for that thread identifies the mutex that the thread is waiting for. If the thread state is Thread_Wait_Cond, mutex/condition field Mutex/Cond identifies the condition variable the thread is waiting for.

FIG. 6-B shows a set of exemplary thread priority registers 76b, each corresponding to a thread, according to some embodiments of the present invention. Each thread priority register 76b includes a current thread priority field CurrThPri, and a default thread priority field DefThPri. For example, the lower the stored number, the higher the associated thread's priority. At reset, each thread starts with its associated default priority. At times, thread instructions execution unit 86 (FIG. 4) sets a thread's priority to a current priority value different (e.g. higher) from the default priority, in order to avoid potential priority inversion problems. The system thread always has the highest priority. As above, the unused bits are reserved, and can be set to 0.

FIG. 6-C shows a set of exemplary real time interrupt mask (RTIM) registers 76c, each corresponding to a thread, according to some embodiments of the present invention. Each bit in an RTIM register 76c is an interrupt-enable bit for a real-time interrupt assigned to the register's corresponding thread. Only a number of bits up to the maximum configured number of real-time interrupts (defined by the RTIntNo field in FIG. 5-A) is writable in each RTIM register 76c. FIG. 6-D shows a set of exemplary asynchronous interrupt mask (AIM) registers 76d, each corresponding to a thread, according to some embodiments of the present invention. Each bit in an AIM register 76d is an interrupt-enable bit for an asynchronous interrupt assigned to the register's corresponding thread. Only a number of bits up to the maximum configured number of asynchronous interrupts (defined by the AIntNo field in FIG. 5-A) is writable in each AIM register 76d.

FIG. 6-E shows a set of exemplary thread program counter (PC) registers 76e, each corresponding to a thread, according to some embodiments of the present invention. Each PC register 76e holds the address of the next instruction to be fetched for the corresponding thread. The system can read but not modify the contents of PC registers 76e. FIG. 6-F shows a set of exemplary thread multiply-accumulate context (TM) registers 76f, each corresponding to a thread, according to some embodiments of the present invention. If MMU 26 includes a multiply-accumulate (MAC) unit, each TM register 76f includes a multiply-accumulate enable field M, and a multiply-accumulator context MACtx. Both fields are initialized to 0 at reset. Only the system thread writes to TM registers 76f. TM registers 76f serve to associate MAC contexts to threads.

FIG. 7 shows a set of exemplary mutex thread lock registers 80, each corresponding to a mutex, according to some embodiments of the present invention. The set of mutex lock registers 80 and the global mutex lock state register 74d (FIG. 5-D) store a state of the mutexes employed by MMU 26. Each mutex thread lock register 80 identifies the thread which currently has a lock on the mutex corresponding to the register. FIG. 8 shows a set of exemplary condition mutex registers 82, each corresponding to a condition variable, according to some embodiments of the present invention. Each condition mutex register 82 indicates which mutex is associated with the condition variable corresponding to the register.

Figure 9:
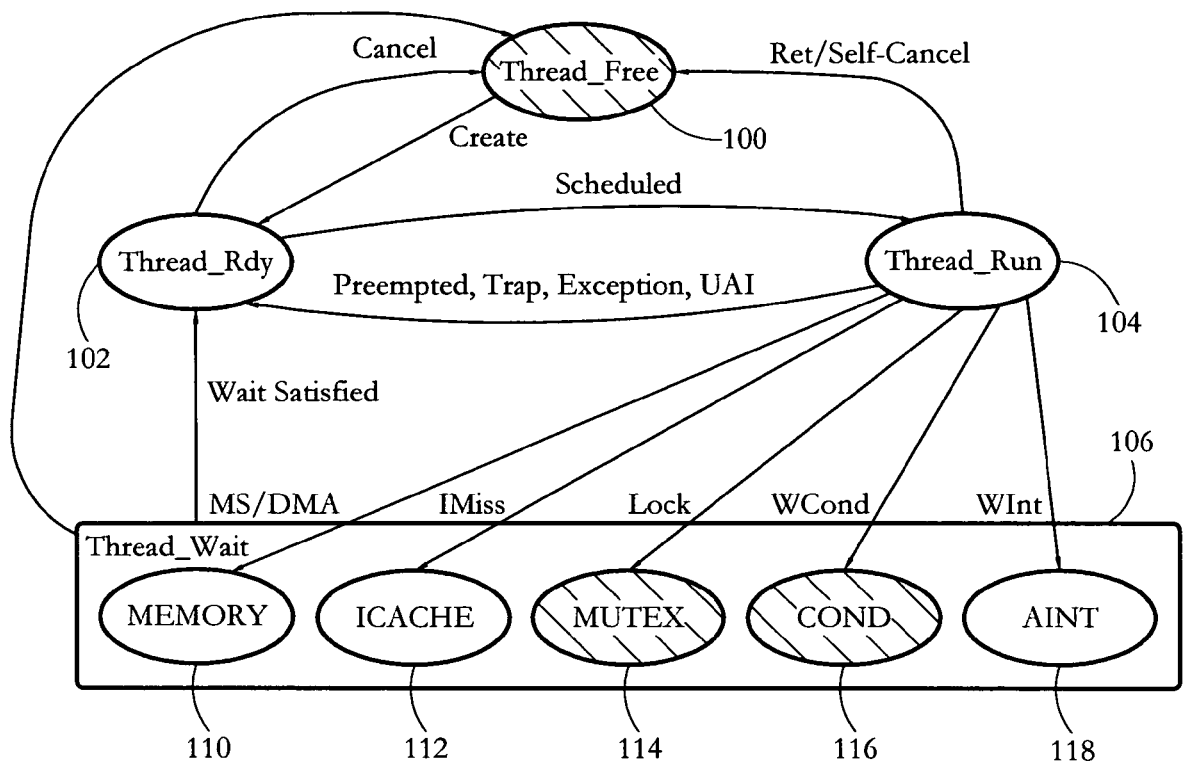
FIG. 9 shows a thread state diagram illustrating the operation of the thread controller of FIG. 4, according to some embodiments of the present invention.

Thread state transition controller 90 (shown in FIG. 4) controls the transitions between states of the various threads. FIG. 9 is a thread state transition diagram illustrating the operations performed by thread state transition controller 90 for an exemplary processing (non-system) thread. The system thread can use some of the states used by processing threads, but preferably does not use the thread states shown hatched in FIG. 9.

As shown in FIG. 9, a processing thread initially in a Thread_Free state 100 may change state to a Thread_Rdy state 102. This state transition can be viewed as a creation of the thread, while the reverse state transition is a cancellation of the thread. When the thread is scheduled to execute, its state is changed to a Thread_Run state 104. The reverse thread state transition occurs upon a thread preemption, trap, exception, or unassigned asynchronous interrupt (UAINT). The thread also transitions directly from Thread_Run state 104 to Thread_Free state 100 when the thread self-cancels or is retired by the system thread. The thread transitions from Thread_Run state 104 to a Thread_Wait state 106 upon a number of occurrences described below. Upon a memory stall or direct memory access (DMA), the thread transitions to a Thread_Wait_Memory state 110, a substate of Thread_Wait state 106. The thread transitions to an I-Cache sub-state 112 upon an I-cache miss, to a Thread_Wait_Mutex sub-state 114 upon a Mutex lock (lock) instruction, to a Thread_Wait_Cond sub-state 116 upon a Wait Condition (waitcond) instruction, and to a Thread_Wait_Aint sub-state 118 upon a Wait Interrupt (waitint) instruction. The thread transitions from Thread_Wait state 106 to Thread_Rdy state 102 when the wait is satisfied, or to Thread_Free state 100 if the thread is canceled.

Preferably, the system thread does not use the Thread_Free, Thread_Wait_Mutex and Thread_Wait_Cond states (hatched in FIG. 9). The system thread can use the other thread states shown in FIG. 9. On reset, the system thread wakes up in the Thread_Run state 104. The system thread returns to the Thread_Rdy state 102 upon execution of a system return (sret) instruction. The system thread transitions from Thread_Rdy state 102 to Thread_Run state 104 under several conditions, including: after reset, upon execution of a multithreading system call in software, upon receipt of an unassigned asynchronous interrupt or interrupt assigned to the system thread, or when a processing thread currently running has caused an exception. In some embodiments, other events that start the system thread include receipt of a soft-reset or non-maskable interrupt, and a breakpoint signaled by a debug module. When a event causing the system thread to start occurs, the program counter for the system thread is set to a program counter value (trap vector) allowing enough space for two instructions per event type, which is sufficient for a short jump (branch instruction) and a jump-delay-slot instruction.

In some embodiments, the system thread executes at a highest priority and is not interruptible. Any cache misses or memory stalls occurring during execution of the system thread cause waits (stalls). If a system thread instruction causes an exception, the instruction is skipped (its results not committed), an error bit in a thread controller state register is set to reflect the exception, and the execution continues to the next instruction. The system thread does not execute the mutex lock, unlock, trylock, and waitcond instructions referenced above. Real-time interrupts, non-maskable interrupts, and soft-reset interrupts are posted for the system thread if the interrupts occur while the system thread is executing. When the system thread executes a system return (sret) instruction and transitions to Thread_Rdy state 102, thread controller 54 checks for any of these pending interrupts or any pending asynchronous interrupts before starting any other thread. The system thread is restarted at an appropriate entry point in response to the interrupts.

In some embodiments, the system thread executes Wait Interrupt (waitint) instructions. The system thread then transitions to the Thread_Wait_Aint state 118, and no other threads are scheduled. Thread controller 54 stalls, waiting for an interrupt. When the interrupt comes, the system thread continued execution from the instruction following the Wait Interrupt instruction.

In some embodiments, multithreading system call instructions such as mutex locking, wait condition, and condition signal instructions are executed by special-purpose hardware (logic) within thread controller 54 (FIG. 4). Table 3 lists a number of instruction names (mnemonics) and brief descriptions of the associated instructions, according to some embodiments of the present invention.

TABLE 3

| Mnemonic | Description | Mnemonic | Description |
|---|---|---|---|
| rti | set real-time interrupt mask | sreset | soft reset |
| asi | set asynchronous interrupt mask | break | breakpoint |
| waitint | wait for interrupt | create | create thread |
| waitcond | wait for condition | cancel | cancel thread |
| signal | signal condition | priority | change thread priority |
| signalbc | signal broadcast | config | configure hardware |
| lock | lock mutex (committed lock) | notify | system thread notification |
| locktry | test mutex | syscall | host system call |
| unlock | unlock mutex | | |
| prof off | profiling off | | |
| prof on | profiling on | | |

Some hardware-supported system calls can also be implemented in software using the system thread. Each system call can have the form trap #TrapOpcode, wherein TrapOpcode is a 5-bit argument corresponding to a mnemonic listed in Table 3.

The THX register 74b (FIG. 5-B) indicates which system calls are supported in hardware by thread controller 54, and which system calls are to be executed in software by calling the system thread. If a trap instruction is to be executed in hardware, the instruction is directed to thread controller 54 (FIG. 2) for execution. If a system call is to be executed by the system thread in execution pipeline 50, the thread state field ThState of the current thread's thread state register 76a (FIG. 6-A) is set to Thread_Rdy, the call code field CallCd of MMU main state register 74c (FIG. 5-C) is set to indicate a trap, the trap/exception code field TrapEx of register 74c is set to indicate the trap type/opcode, and the system thread starts execution (its state is set to Thread_Run). Traps executed as part of the system thread are ignored (treated as nop).

The detailed description of various instructions below will focus on methods in which the instruction execution is performed in hardware using thread controller 54. Corresponding methods using the system thread can be implemented using system thread trap handler code that emulates the actions described below. Tables 4-A and 4-B illustrate how a thread's Thread Status register 76a (FIG. 6-A) is affected by trap instructions in several situations.

TABLE 4-A

| Instruction/Act | Situation | MMU Thread Status Change |
|---|---|---|
| waitint (System thread) | unassigned AI, or SRI/NMI already asserted | No ThState change; Z/L set to 00 |
| | assigned AI already asserted | No ThState change; Z/L set to 11 |
| | otherwise | ThState <- Thread_Wait_Aint; Z/L set to 10 |
| waitint exit (System thread) | assigned AI | ThState <- Thread_Run; Z/L set to 11 |
| | RTI | ThState <- Thread_Run; Z/L unchanged |
| | UAI, SRI, NMI | ThState <- Thread_Run; Z/L set to 00 |
| waitint | assigned AI already asserted | ThState unchanged; Z/L set to 11 |
| | otherwise | ThState <- Thread_Wait_Aint; Z/L set to 10 |
| waitint exit | assigned AI | ThState <- Thread_Ready; Z/L set to 11 |
| | RTI | ThState <- Thread_Ready; Z/L unchanged |
| waitcond | Bad condition ID or mutex ID | No ThState change; Z/L set to 01 |
| | Mutex not locked by current thread | No ThState change; Z/L set to 00 |
| | Otherwise | ThState <- Thread_Wait_Cond; Condition <- CondId; Z/L set to 10; Actions listed below for unlock |
| waitcond exit | Signal from another thread | ThState <- Thread_Rdy; Z/L set to 11 |
| | Time-out (RTI) | ThState <- Thread_Rdy; Z/L unchanged |

TABLE 4-B

| Instruction/Act | Situation | MMU Thread Status Change |
| --- | --- | --- |
| signal, signalbc | BadCondId | Z/L set to 01 |
| | Otherwise | Z/L set to 11 |
| lock, trylock | Bad mutex ID | No ThState change; Z/L set to 01 |
| | Mutex already locked by this thread | No ThState change; Z/L set to 00 |
| | Lock successful | No ThState change; Z/L set to 11 |
| | Mutex already locked by another thread | For lock: ThState <- Thread_Wait_Mutex; Mutex <- MutexId; Z/L set to 10 For trylock: Z/L flags set to 10 |
| lock exit | Unlock by another thread | ThState <- Thread_Rdy; Z/L set to 11; CurrThreadPri <- max(ThreadPri, CurrThreadPri for all threads still waiting for mutex) |
| | Time out (RTI) | ThState <- Thread_Rdy; Z/L unchanged. For thread holding mutex: CurrThreadPri <- max(ThreadPri, CurrThreadPri for all threads still waiting for mutex) |
| unlock | Bad mutex Id | Z/L set to 01 |
| | Mutex already locked by another thread | Z/L set to 00 |
| | Otherwise | Z/L set to 11; CurrThreadPri <- max(ThreadPri, CurrThreadPri for all threads still waiting for mutex); Actions listed above for lock exit due to unlock |

At least some of the instructions listed in Tables 4-A-B can take arguments from general-purpose register file 30 (FIG. 2), and set or clear the Z and L flags stored in thread state registers 76a (FIG. 6-A) to return a value. In some embodiments, each system call instruction listed in Tables 4-A-B is immediately followed by a conditional jump instruction causing a jump to an appropriate error-handling or other responsive routine if the multithreading system call encounters an error or other condition, as indicated by the Z and/or L flags. The outcomes of at least some jump instructions dependent on L flags (e.g. jump if less, jump if greater or equal instructions) are independent on the signed arithmetic (SA) flags stored in thread state registers 76a.

Real-time interrupt (RTI) and asynchronous interrupt (ASI) instructions of the form rti A0, asi A0 can be used to assign the value in a general-purpose register A0 to the real-time interrupt and asynchronous interrupt mask registers 76c, 76d, respectively (FIGS. 6-C-D). In some embodiments, a processing thread only receives interrupts it has assigned to itself through real-time interrupt or asynchronous interrupt instructions. In some embodiments, real-time interrupt instructions are inserted immediately before asynchronous interrupt and wait condition instructions, so that a real-time interrupt is received after a fixed period of time elapses if no asynchronous interrupt or condition signal is received before then.

FIG. 10-A shows a sequence of steps 300 performed by MMU 26 during an execution of an asynchronous interrupt wait (waitint) instruction by a processing thread according to some embodiments of the present invention. The waitint instruction has no arguments, and returns Z=1 && L=1 on success (assigned asynchronous interrupt), Z=1 && L=0 if timed-out (assigned real-time interrupt), and Z=0 && L=0 on error, if another interrupt comes (only for system thread). When a processing thread executes a waitint instruction, MMU 26 checks whether there are any assigned asynchronous interrupts currently asserted (step 302). If yes, execution continues, and the Z and L flags are set (step 304). If no, the ThState field in thread status register 76a (FIG. 6-A) is set to Thread_Wait_Aint (step 306), the Z flag is set and the L flag is cleared to indicate a time-out (step 308), and a real-time interrupt timeout counter is set according to the thread's real-time interrupt register 76c (FIG. 6-C) (step 310). The timeout counter is a start-timeout bit vector asserted to RTC 32 (FIG. 2). When an asynchronous interrupt is received or when the RTC real-time interrupt times out, the thread transitions back to the Thread_Rdy state (step 312). The Z and L flags are set when an asynchronous interrupt is received, and preserved when a real-time interrupt is received. The thread is then scheduled according to its priority (step 316).

FIG. 10-B shows a sequence of steps 320 performed by MMU 26 during an execution of an asynchronous interrupt wait (waitint) instruction by the system thread according to some embodiments of the present invention. The system thread receives interrupts which can be classified into two categories: a first category including asynchronous interrupts assigned to the system thread and real-time interrupts assigned to the system thread; and a second category including unassigned asynchronous interrupts, non-maskable interrupts, and soft-reset interrupts. In a step 322, MMU 26 checks whether there are any Category 2 interrupts pending. If so, execution continues and the Z and L flags are cleared to indicate an error (step 322). If not, MMU 26 checks for asynchronous interrupts assigned to the system thread (step 324). If an assigned asynchronous interrupt is found, the system thread continues execution, and the Z and L flags are set (step 328). If no assigned asynchronous interrupt is found, the system thread checks for pending real-time interrupts (step 330). If a pending real-time interrupt is found, the system thread continues execution, the Z flag is set and the L flag is cleared (step 332). Otherwise, the system thread's state is set to Thread_Wait_Aint (step 334), the real-time interrupt timeout counter is set according to the thread's real-time interrupt register 76c (FIG. 6-C) (step 336), and the Z flag is set and the L flag cleared to indicate a timeout (step 338). The system thread then waits for an interrupt (MMU 26 stalls), and no other threads are scheduled (step 340). When any Category 1 or 2 interrupt is received, the system thread transitions back to the Thread_Run state (step 342). If the received interrupt is a Category 1 interrupt, the waitint function return values are those listed above for processing threads: Z=1 && L=1 on success (assigned asynchronous interrupt), Z=1 && L=0 if timed-out (assigned real-time interrupt). If the received interrupt is a Category 2 interrupt, then both the Z and L flags are cleared to indicate an error. When the system thread executes a soft reset, MMU 26 re-enters the system thread with a call code CallCd (FIG. 5-C) corresponding to the highest-priority interrupt.

Figure 11:
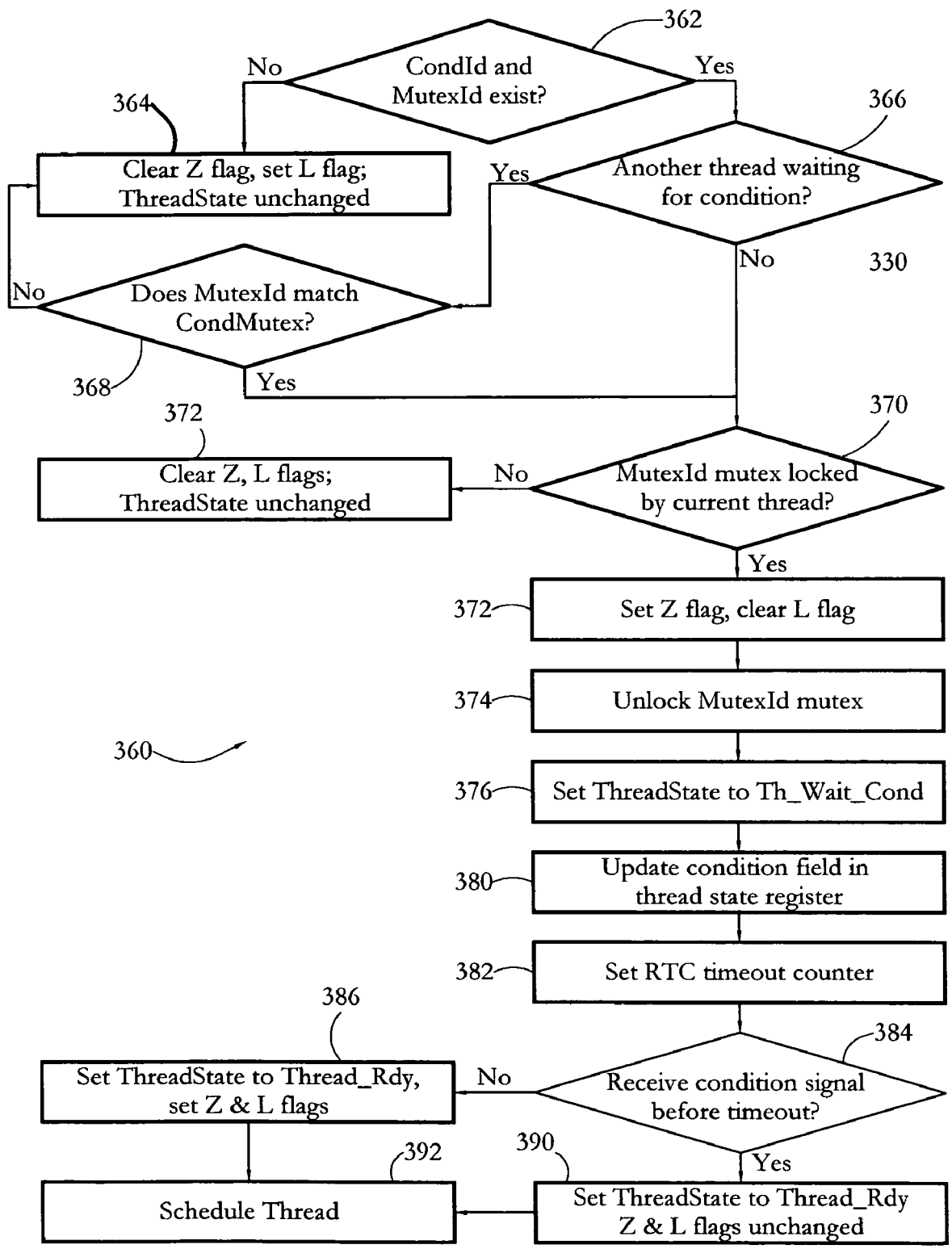
FIG. 11 shows a sequence of steps performed during an execution of a condition wait (waitcond) instruction by a processing thread, according to some embodiments of the present invention.

FIG. 11 shows a sequence of steps 360 performed during an execution of a condition wait (waitcond) instruction by a processing thread, according to some embodiments of the present invention. In some embodiments, the system thread cannot use the waitcond instruction. The waitcond instruction has two arguments: a mutex identifier (MutexId) and a condition identifier (CondId). These arguments and the arguments discussed below for other functions can be provided as the identities of general-purpose registers storing the argument data. The instruction returns: Z=1 && L=1 on success; Z=1 && L=0 if timed-out (assigned real-time interrupt); Z=0 && L=1 if the condition variable or mutex does not exist, or when another thread waits for the CondId condition variable (when the field CondMutex shown in FIG. 8 identifies another thread); and Z=0 && L=0 if the MutexId mutex is not locked by the current thread.

In a step 362, MMU 26 checks whether the instruction arguments exist by comparing the CondId argument against the CondNo field of configuration register 74a (FIG. 5-A), and the MutexId argument against the MutexNo field of register 74a. If the condition variable or mutex does not exist, the Z flag is cleared and the L flag is set (step 364). The processing thread does not change state, as noted in Table 4-A. If the designated condition variable and mutex exist, MMU 26 checks whether any other thread is waiting for the same condition (step 366). If yes, the MutexId argument is compared with the CondMutex field of the condition mutex register 82 (FIG. 8) corresponding to the CondId condition variable, to check whether the MutexId mutex is currently associated with the CondId condition variable (step 368). If the MutexId argument does not match the CondMutex field, the Z flag is cleared and the L flag is set. If the MutexId argument matches the CondMutex field, or if no other thread is waiting for the CondId condition variable, MMU 26 determines whether the MutexId mutex is locked by the current thread (step 370). To perform step 370, MMU 26 uses the MutexId argument to check global mutex lock state register 74d (FIG. 5-D) and the mutex thread lock register 80 (FIG. 7) for the MutexId thread. If the MutexId mutex is not locked by the current thread, the Z and L flags are cleared (step 372).

In a step 374, MMU 26 unlocks the mutex identified by the MutexId argument, as described below in the description of steps performed in response to a mutex unlock instruction. The thread state is set to Thread_Wait_Cond (step 376), and the condition (mutex/condition) field in thread state register 76a (FIG. 6-A) is updated to contain an identifier of the CondId condition variable. The real-time interrupt timeout counter is set according to the thread's real-time interrupt register 76c (FIG. 6-C) (step 382). MMU 26 determines whether a condition signal is received (the waitcond succeeds) before an instruction timeout (step 384). If the thread receives the condition signal, the thread state transitions to Thread_Rdy and the Z and L flags are set (step 386). If instead the waitcond times out, the thread state transitions to Thread_Rdy and the Z and L flags remain unchanged (step 390). Once in a Thread_Rdy state, the thread is scheduled according to its priority (step 392).

Figure 12:
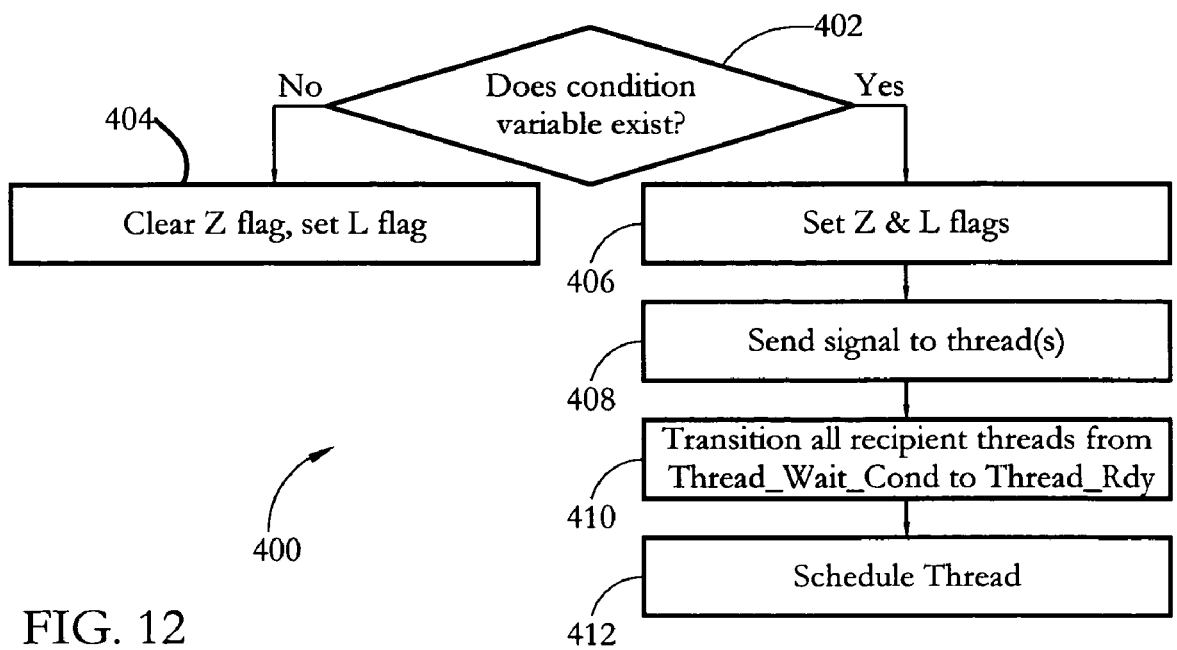
FIG. 12 shows a sequence of steps performed during an execution of a condition signal (signal, signalbc) instruction, according to some embodiments of the present invention.

FIG. 12 shows a sequence of steps 400 performed during an execution of a condition signal (signal, signalbc) instruction, according to some embodiments of the present invention. Each condition signal instruction has one argument: a condition identifier (CondId). The instruction returns Z=1 && L=1 on success, and Z=0 && L=1 if the condition variable does not exist. When a condition signal instruction is executed, MMU 26 checks whether the CondId condition variable exists (step 402). To determine whether the condition variable exists, MMU 26 compares the CondId argument with the CondNo field of configuration register 74a (FIG. 5-A). If the CondId condition variable does not exist, the Z flag is cleared and the L flag is set (step 404); if it exists, both Z and L flags are set (step 406). A condition signal is then sent to one or more threads: for the single-recipient signal instruction, the signal is sent to the waiting thread with the highest priority; for the broadcast signalbc instruction, the signal is sent to all waiting threads (step 408). The thread(s) receiving the condition signal are transitioned from the state Thread_Wait_Cond to the state Tread_Rdy (step 410), and the threads are scheduled according to their priorities (step 412).

FIG. 13-A shows a sequence of steps 440 performed during an execution of a committed lock mutex (lock) instruction according to some embodiments of the present invention. In some embodiments, the lock mutex instruction can be executed only by processing threads, and not by the system thread. The instruction has one argument: a mutex identifier (MutexId). The instruction returns: Z=1 && L=1 on success; Z=1 && L=0 if timed-out (assigned real-time interrupt); Z=0 && L=1 if the mutex does not exist; and Z=0 && L=0 if the MutexId mutex is already locked by the current thread. When a lock instruction is executed, MMU 26 checks whether the mutex identified by the MutexId argument exists by comparing the MutexId argument to the MutexNo field of configuration register 74a (FIG. 5-A) (step 442). If the MutexId mutex does not exist, the Z flag is cleared and the L flag is set (step 444).

If the mutex exists, MMU 26 determines whether the mutex is already locked by the current thread by checking the mutex lock state register 74d (FIG. 5-D) and the mutex thread lock register 80 corresponding to the executing thread (FIG. 7) (step 446). If yes, the Z and L flags are cleared (step 448). In a step 450, MMU 26 determines whether the mutex is already locked by another thread. If the mutex is unlocked, the bit corresponding to the MutexId mutex in mutex lock state register 74d (FIG. 5-D) is set (step 452), the current thread's ID is written to the MutexThread field in mutex thread lock register 80 (FIG. 7) (step 454), and the L flag is set (step 456).

If the mutex is locked by another thread, the current thread's ThState and Mutex/Cond fields in thread status register 76a are set to Thread_Wait_Mutex and MutexId, respectively (step 460), the L flag is cleared to its default value to indicate a timeout (step 462), and the real-time interrupt timeout counter is set according to the thread's real-time interrupt register 76c (FIG. 6-C) (step 464). In a step 466, MMU 26 determines whether the current thread's priority is higher than the priority of the thread holding the mutex lock. The two priorities are determined by examining the CurrThPri fields of the priority registers 76b (FIG. 6-B) corresponding to the two threads. If the current thread's priority is higher than the locking thread's priority, the locking thread's priority is increased to the current thread's priority (step 468). Increasing the locking thread's priority is achieved by writing the contents of the CurrThPri field of the current thread's priority register 76b into the CurrThPri field of the locking thread's priority register 76b.

If the mutex is unlocked by another thread and transferred to the current thread (step 472), the current thread transitions from the Thread_Wait_Mutex to the Thread_Rdy state, and the Z & L flags are set (step 474). The current thread is then scheduled based on its priority (step 476). If the mutex lock times out (a real-time interrupt assigned to the current thread is received before the mutex is given the current thread), the current thread transitions from the Thread_Wait_Mutex to the Thread_Rdy state, and the Z & L flags are unchanged (step 476). The current priority (CurrThPri field) of the thread still holding the lock is set to the maximum of its default priority (DefThPri) and the current priority of all other threads waiting for the lock, if any (step 480).

FIG. 13-B shows a sequence of steps 500 performed during an execution of a test mutex (locktry) instruction, according to some embodiments of the present invention. The test mutex instruction has the same arguments and return values as the lock instruction. Sequence 500 includes the steps 442-452 described above for the lock instruction, but not the steps 460 and 464-480. If the MutexId mutex is locked by another thread, the L flag is cleared and the thread execution continues (step 462).

FIG. 13-C shows a sequence of steps 520 performed during an execution of an unlock mutex (unlock) instruction, according to some embodiments of the present invention. In some embodiments, the unlock mutex instruction can be executed only by processing threads, and not by the system thread. The instruction has one argument: a mutex identifier (MutexId). The instruction returns: Z=1 && L=1 on success; Z=0 && L=1 if the mutex does not exist; and Z=0 && L=0 if the MutexId mutex is not owned by the current thread. When an unlock instruction is executed, MMU 26 checks whether the mutex identified by the MutexId argument exists by comparing the MutexId argument to the MutexNo field of configuration register 74a (FIG. 5-A) (step 522). If the MutexId mutex does not exist, the Z flag is cleared and the L flag is set (step 524).

If the MutexId mutex exists, MMU 26 determines whether the mutex is locked by the current thread (step 526). If the mutex is not locked or is locked by another thread (if the current thread does not hold the mutex lock), the Z and L flags are cleared (step 528). Otherwise, if the current thread holds the mutex lock, the Z and L flags are set to indicate success (step 530). If the unlock is successful, MMU 26 determines if any threads are waiting for the mutex (step 532). If not, the bit corresponding to the MutexId mutex in the mutex lock state register 74b (FIG. 5-D) is cleared (step 534). The executing thread's current priority (CurrThPri field of the priority register 76b shown in FIG. 6-B) is set to the maximum of its default priority (DefThPri field) and the current thread priorities of all threads still waiting for mutexes the current thread still holds (step 544).

If at least one thread is waiting for the mutex, the highest-priority thread waiting for the mutex is given the mutex, which is an implicit mutex lock (step 536). The highest-priority waiting thread's state transitions from Thread_Wait_Mutex to Thread_Rdy, with the Z and L flags remaining unchanged (step 538); and its current thread priority (CurrThPri field of the priority register 76b shown in FIG. 6-B) is set to the maximum of its default priority (DefThPri field) and the current thread priorities of all threads still waiting for the mutex (step 540). The executing thread's priority is set as described above in step 544. Subsequent scheduling is performed using the adjusted thread priority or priorities (step 548).

As listed in Table 3, MMU 26 supports a number of additional system call instructions according to some embodiments. Such instructions include a profiling instruction prof, a soft reset instruction sreset, a breakpoint instruction break, a create thread instruction create, a cancel thread instruction cancel, and a change thread priority instruction priority. The profiling instruction (profiling on, profiling off) enables or disables thread profiling, described in detail below. The instruction sets or clears the P field in the MMU main state register 74c (FIG. 5-C). The instruction has no arguments and no return values. The soft reset instruction results in the system thread's canceling all other threads and resetting the processor state so that the processing threads can be restarted. The instruction can be used for debugging or as a catch-all watch dog function. The instruction has no arguments or return values. The breakpoint instruction creates a breakpoint, which can be used for debugging. The instruction has no arguments or return values.

Figure 14:
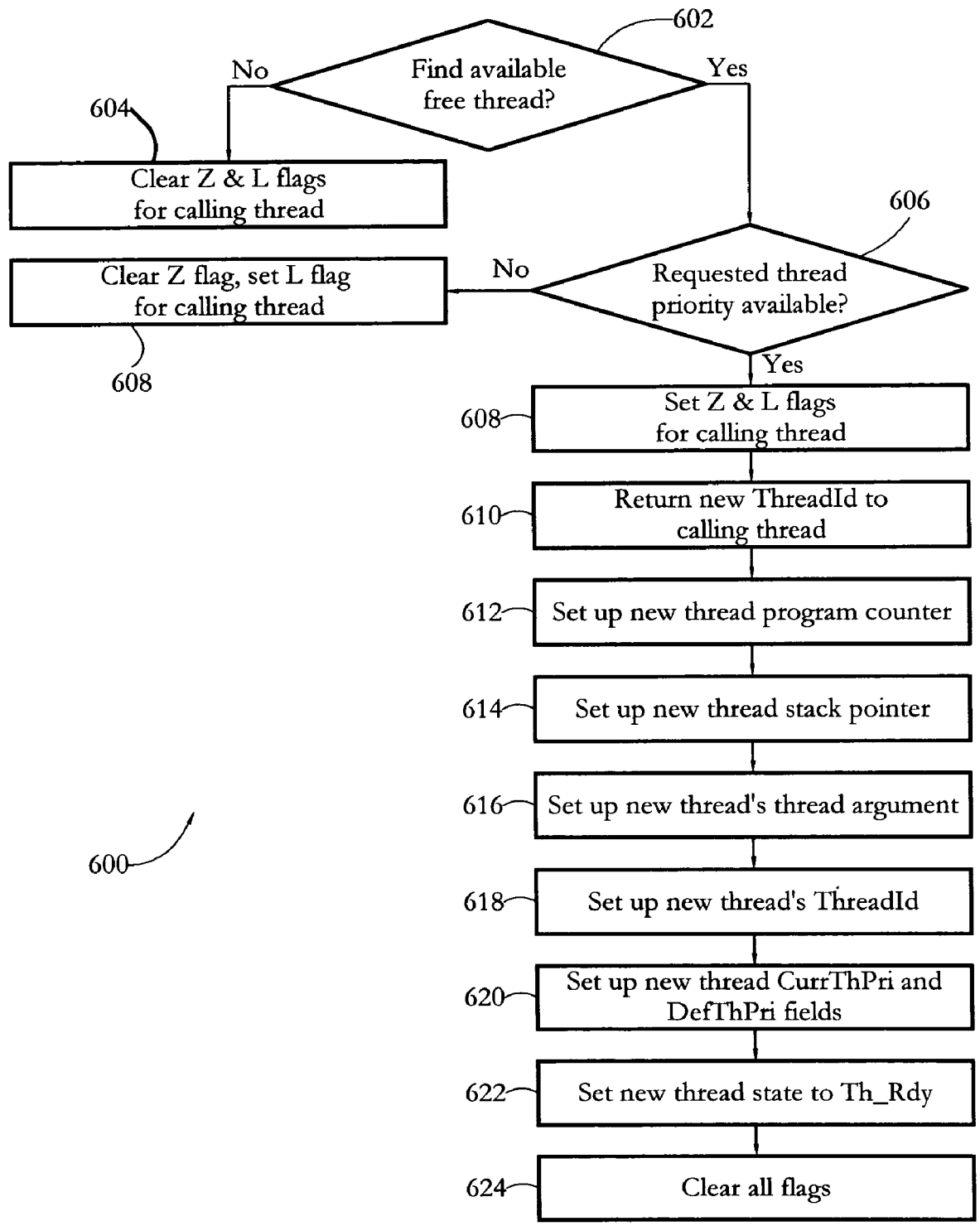
FIG. 14 shows a sequence of steps performed during an execution of a create thread (create) instruction, according to some embodiments of the present invention.

FIG. 14 shows a sequence of steps 600 performed during an execution of a create thread (create) instruction, according to some embodiments of the present invention. In some embodiments, the instruction is executed in software by the system thread. The create instruction has four arguments: a new thread start address, a thread priority, a stack pointer, and a thread argument. The arguments can be provided as the identities of four general-purpose registers of the calling thread that store the argument data. The function returns a ThreadId and several alternative values for the Z and L flags: Z=1 && L=1 on success; Z=0 && L=1 if the thread priority argument designates a priority that is already taken or not valid; and Z=0 && L=0 if all threads are in use. In a step 602, the system thread determines whether there is any available free thread by checking the ThreadNo field of configuration register 74a (FIG. 5-A) and searching the ThState fields of thread state registers 76a (FIG. 6-A) until a free thread (state=Thread-Free) is found. If no free thread is found, the Z and L flags of the calling thread are cleared (step 604).

If a free thread is found, the system thread determines whether the requested thread priority is available by checking the DefThPri fields of the priority registers 76b (FIG. 6-B) of previously created threads (step 606). If the requested thread priority is taken or not valid, the Z flag is cleared and the L flag is set in the context of the calling thread. Otherwise, the system thread sets the Z and L flags of the calling thread (step 608), returns the new ThreadId value to the calling thread by placing the ThreadId in an argument general-purpose register of the calling thread (step 610), and sets up the state of the newly created thread in a number of steps described below.

In a step 612, the system thread places the new thread start address argument in the new thread's program counter (PC) register 76e (FIG. 6-E). The new thread stack pointer argument is placed into the new thread's stack pointer register (step 614). The thread argument received as a function argument from the calling thread is placed into a general-purpose argument register of the new thread (step 616). The ThreadId of the new thread is placed into another general-purpose register of the new thread (step 618). In a step 620, the CurrThPri and DefThPri fields of the new thread's priority register 76b (FIG. 6-B) are loaded with the new thread priority received as an instruction argument from the calling thread. The ThState field of the new thread's thread status register 76a (FIG. 6-A) is set to Thread_Rdy (step 622). In a step 624, the new thread's flags are cleared.

Figure 15:
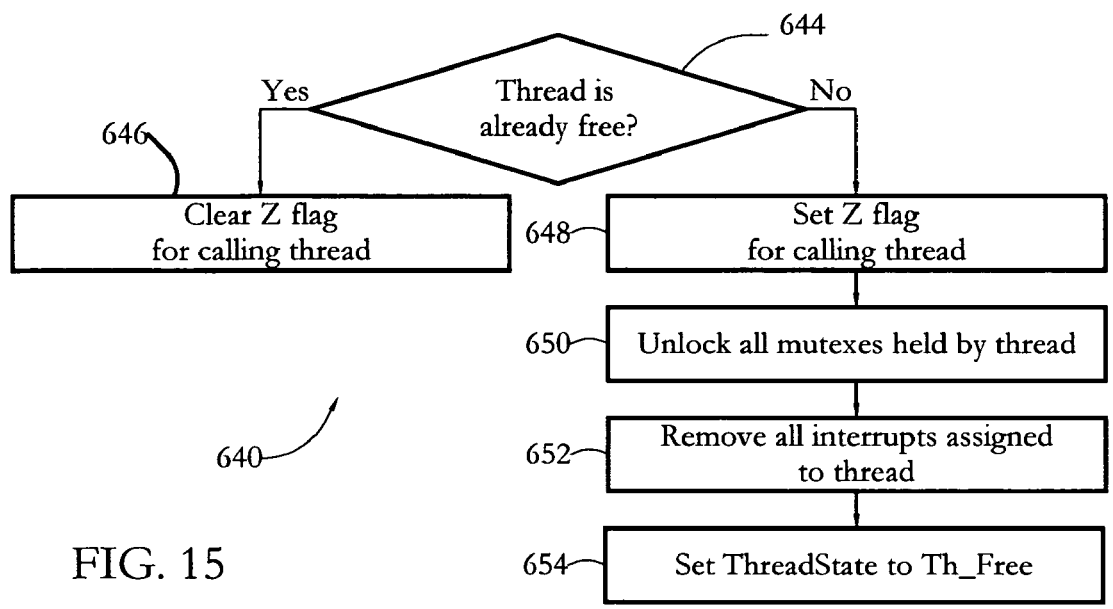
FIG. 15 shows a sequence of steps performed during an execution of a cancel thread (cancel) instruction, according to some embodiments of the present invention.

FIG. 15 shows a sequence of steps 640 performed during an execution of a cancel thread (cancel) instruction, according to some embodiments of the present invention. The cancel instruction has two arguments: a thread identifier (ThreadId), and an exit argument. The arguments can be provided as the identities of two general-purpose registers of the calling thread that store the argument data. The function returns Z=1 on success, and Z=0 if the thread does not exist. In a step 642, the system thread determines whether the ThreadId thread is already free (does not exist) by checking the ThState of the thread status register 76a (FIG. 6-A) for the ThreadId thread. If the thread is already free, the system thread clears the Z flag of the calling thread (step 644). Otherwise, the system thread sets the Z flag of the calling thread (step 646), and cancels the designated thread as described below. The system thread unlocks all mutexes held by the designated thread (step 646), removes all real-time and asynchronous interrupts assigned to the designated thread (step 648), and sets the ThState field of the designated thread's thread status register 76a (FIG. 6-A) to Thread_Free.

Figure 16:
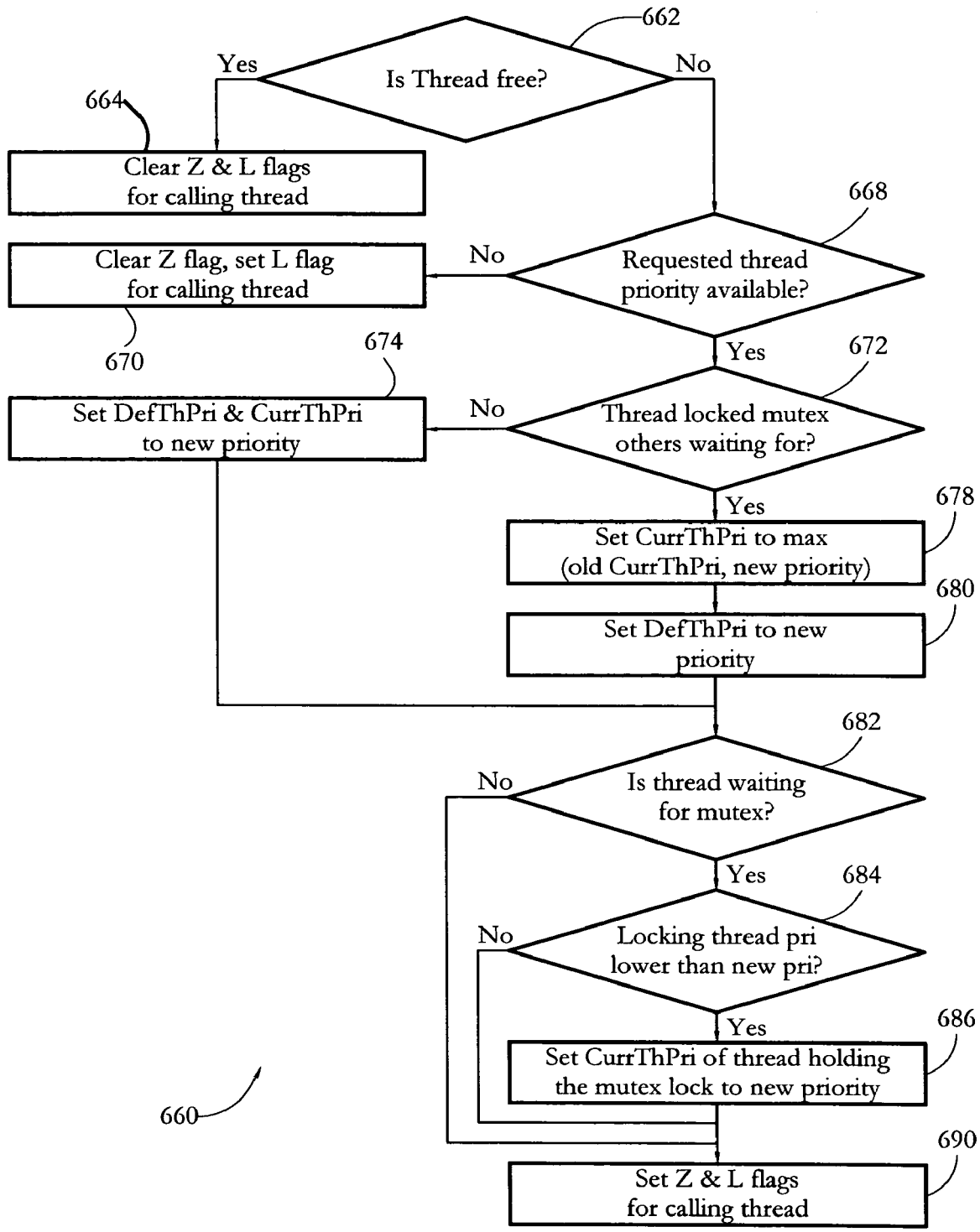
FIG. 16 shows a sequence of steps 660 performed during an execution of a change thread priority (priority) instruction, according to some embodiments of the present invention.

FIG. 16 shows a sequence of steps 660 performed during an execution of a change thread priority (priority) instruction, according to some embodiments of the present invention. The priority instruction has two arguments: a thread identifier (ThreadId), and a new thread priority. The arguments can be provided as the identities of two general-purpose registers of the calling thread that store the argument data. The function returns Z=1 && L=1 on success; Z=0 && L=1 if the new thread priority argument designates a new priority that is already taken or not valid; and Z=0 && L=0 if the thread does not exist. In a step 662, the system thread determines whether the ThreadId thread is free by checking the ThState field of the corresponding thread status register 76a (FIG. 6-A). If the thread is free, the Z and L flags of the calling thread are cleared (step 664). If the thread exists, the system thread determines whether the requested new thread priority is available by checking the DefThPri fields of the priority registers 76b (FIG. 6-B) of previously created threads (step 668). If the requested new priority is not available, the Z flag is cleared and the L flag is set in the context of the calling thread (step 670).

If the current thread exists and the requested new priority is available, the system thread changes the DefThPri and CurrThPri fields of the targeted thread's priority register 76b (FIG. 6-B) as described below. In a step 672, the system thread determines whether the targeted thread holds a lock on a mutex that any other threads are waiting for. If not, DefThPri and CurrThPri are set to the new priority (step 674). If yes, CurrThPri is set to the maximum of the new priority and the old CurrThPri (i.e. the thread's current priority is not decreased) (step 678), and DefThPri is set to the new priority (step 680).

In a step 682, the system thread determines whether the targeted thread is waiting for any mutex by checking whether the ThState field of the thread's status register 76a (FIG. 6-A) designates the Thread_Wait_Mutex state. If yes, the CurrThPri field for the thread holding the mutex lock is set to be at least as high as the new priority of the targeted thread. The system thread determines whether the locking thread's priority is lower than the new priority (step 684), and, if yes, sets the locking thread's current priority to the new priority (step 686). Finally, the Z and L flags for the calling thread are cleared (step 690).

Figure 17:
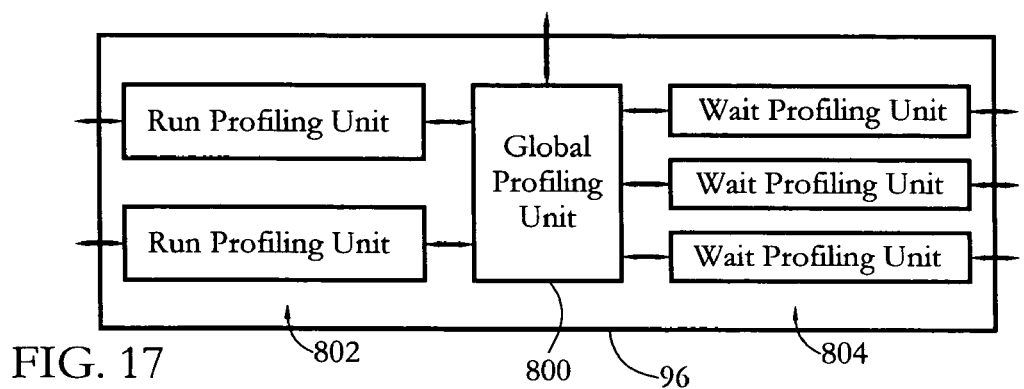
FIG. 17 is a schematic diagram of hardware thread profiler according to some embodiments of the present invention.

FIG. 17 is a schematic diagram of hardware thread profiler 96 (FIG. 4) according to some embodiments of the present invention. Thread profiler 96 includes a global profiling unit (GPU) 800, a set of run profiling units (RPUs) 802 connected to GPU 800, and a set of wait profiling units (WPUs) 804 connected to GPU 800. GPU 800, RPUs 802, and WPUs 804 are further connected to various functional blocks of MMU 26 as described below.

Each profiling unit 800-804 is connected to at least some of the special-purpose thread purpose profiling registers 78 (FIG. 4). Registers 78 can also be considered to form part of thread profiler 96. Each profiling unit 800-804 comprises profiling logic configured to control the contents of a set of corresponding profiling registers 78 as described in detail below. Profiling registers 78 are memory-mapped and made available through load instructions to all threads. In some embodiments, only the system thread can alter the contents of the profiling registers; an attempted store by any other thread causes an exception, and DMA operations are not allowed for this space. All thread profiling counters described below are cleared when a profile-enable (prof on) instruction is executed. The counters are incremented only when thread profiling is indicated to be active by the profiling flag P in MMU main state register 74c (FIG. 5-C).

Table 5 lists descriptions for a number of thread profiling registers 78 according to some embodiments of the present invention, and a set of permitted operations that can be performed on the thread profiling registers 78 by the system thread. As shown in Table 5, profiling registers 78 include a set of global profiler registers, a set of run profiling registers, and a set of wait profiling registers.

TABLE 5

| Type | Description | Access |
| --- | --- | --- |
| Run Profiler | Threads Mask | R/W |
| Run Profiler | Instructions Counter | Read |
| Run Profiler | RUN Cycles Counter | Read |
| Run Profiler | RDY Cycles Counter | Read |
| Run Profiler | RUN to WAIT_ICACHE Transitions | Read |
| Run Profiler | RUN to WAIT_MEMORY Transitions | Read |
| Run Profiler | RUN to WAIT_MUTEX Transitions | Read |
| Run Profiler | RUN to WAIT_COND Transitions | Read |
| Run Profiler | RUN to WAIT_AINT Transitions | Read |
| Run Profiler | RUN to RDY Transitions | Read |
| Run Profiler | Priority Raises Counter | Read |
| Wait Profiler | Thread ID and Wait States Masks | R/W |
| Wait Profiler | Wait States Counter 0 | Read |
| Wait Profiler | Wait States Counter 1 | Read |
| Wait Profiler | Wait States Counter 2 | Read |
| Wait Profiler | Wait States Counter 3 | Read |
| Wait Profiler | Wait States Counter 4 | Read |
| Global Profiler | Configuration | Read |
| Global Profiler | Cycles Counter | Read |
| Global Profiler | System Thread Cycles Counter | Read |
| Global Profiler | Restricted Miss Scheduler Counter | Read |

As shown in Table 5, profiling registers 78 include a set of global profiler registers, a set of run profiling registers, and a set of wait profiling registers. FIG. 18-A shows a set of global profiling registers 78G-1-3 according to some embodiments of the present invention. The contents of global profiling registers 78G-1-3 are updated by profiling logic within GPU 800 (FIG. 17). As illustrated in FIG. 18-A, a first register 78G-1 includes several configuration fields: RunProfNo, denoting a number of available RPUs 802 (FIG. 17); WaitProNo, denoting a number of available WPUs 804 (FIG. 17); WCtNo, denoting a number of available wait counters; StateCtWidth, indicating a width of a set of profiling state counters; and TransCtWidth, indicating a width of a set of transition state counters. Table 6 lists the configuration fields of register 78G-1 and their associated value ranges according to some embodiments of the present invention.

TABLE 6

| Abbreviation | Range | Description |
| --- | --- | --- |
| RPN | 0-32 | Run Profiling Number |
| WPN | 0-32 | Wait Profiling Number |
| WCN | 1-5 | Wait Counter Number |
| SCW | 1-32 | State Counter Width |
| TCW | 1-32 | Transition Counter Width |

A set of second registers 78G-2 includes a first register holding a field GP_Cycles indicating a number of cycles that thread profiling is active, and a second register holding a field GP_SysThdCycles indicating a number of cycles that the system thread is in a Thread_Run state while thread profiling is active. A third register 78G-3 holds a field GP_R-MissSched, which counts a number of times thread scheduler 94 (FIG. 4) has restricted the schedule of threads in Thread_Wait_ICache and Thread_Wait_Memory to only the highest priority thread in order to break continuous thread preemption while thread profiling is active.

FIG. 18-B shows a set of run profiling registers 78R-1-3 corresponding to a RPU 802 (FIG. 17) according to some embodiments of the present invention. The contents of run profiling registers 78R-1-3 are updated by profiling logic within the register set's corresponding RPU 802. Run profiling registers 78R-1-3 include one TN (thread number)-bit thread mask register 78R-1, three SCW-bit counters 78R-2, and seven TCW-bit counters 78R-3. As illustrated in FIG. 18-B, a first register 78R-1 holds a field RPi_ThreadMask, which is a bit mask used to select threads that will be profiled by the corresponding RPU 802. Each bit in register 78R-1 corresponds to one thread. A set of second registers 78R-2 includes three registers holding fields RPi_Instrs, RPi_RunCycles, and RPi_RdyCycles, respectively. The RPi_Instrs field counts a number of completed instructions by any of the threads selected for thread profiling (as indicated by the RPi_ThreadMask bit mask) while thread profiling was active. The RPi_RunCycles field counts a number of cycles any of the threads selected for profiling was in the Thread_Run state while thread profiling was active. The RPi_RdyCycles field counts a number of cycles any of the threads selected for profiling was in the Thread_Rdy state and no selected thread was in the Thread_Run state while thread profiling was active. A third set of registers 78R-3 includes registers holding several fields: RPi_Run2WIC, RPi_Run2WMem, RPi_Run2WMtx, RPi_Run2WCond, RPi_Run2WAint, RPi_Run2Rdy, and RPi_PriRaises. The RPi_Run2WIC field counts a number of transitions from Thread_Run to Thread_Wait_ICache by any of the threads selected for profiling while thread profiling was active. The RPi_Run2WMem field counts a number of transitions from Thread_Run to Thread_Wait_Memory by any of the selected threads while thread profiling was active. The RPi_Run2WMtx field counts a number of transitions from Thread_Run to Thread_Wait_Mutex by any of the selected threads while thread profiling was active. The RPi_Run2WCond field counts a number of transitions from Thread_Run to Thread_Wait_Cond by any of the selected threads while thread profiling was active. The RPi_Run2WAInt field counts a number of transitions from Thread_Run to Thread_Wait_Aint by any of the selected threads while thread profiling was active. The RPi_Run2Rdy field counts a number of transitions from Thread_Run to Thread_Rdy by any of the selected threads while thread profiling was active. The RPi_PriRaises field counts a number of times the priority of any of the selected threads was raised while thread profiling was active.

FIG. 18-C shows a set of wait profiling registers 78W-1-2 corresponding to a WPU 804 (FIG. 17) according to some embodiments of the present invention. The contents of wait profiling registers 78W-1-2 are updated by profiling logic within the register set's corresponding WPU 804. Wait profiling registers 78W-1-2 include a ($\log_2$ TN+WCN*5)-bit thread ID and wait states mask register 78W-1, and WCN SCW-bit counters 78W-2, wherein TN is the total thread number (Table 1), $\log_2$ TN is a thread width of a number of bits needed to represent the thread number TN, and WCN and SCW are the parameters listed in Table 6.

A first wait profiling register 78W-1 holds a number of wait profiling fields: WPi_WaitMask0-4, and WPi_ThdId. A set of second wait profiling registers 78W-2 hold WCN wait state counter fields WPi_WaitCyclej, j=0 . . . WCN-1. The WPi_ThdId field if register 78W-1 selects a thread that will be profiled by the WPU 804 corresponding to registers 78W-1-2. Each WPi_WaitMaskj field, j=0 . . . 4, selects the wait states of the selected thread (identified by WPi_ThdId) that will be profiled by a corresponding $j^{th}$ wait states counter (WPi_WaitCyclesj). For example, the WPi_WaitMask2 field selects the wait states of the selected thread that will be profiled by the wait state counter WPi_WaitCycles2. Table 2 above lists a number of available thread states.

For a system using the exemplary register types illustrated above, the total number of thread profiling register bits $N_{total}$ is:

$$N_{total}=N_{global}+N_{run}+N_{wait}. \quad [1]$$

wherein $N_{global}$, $N_{run}$ and $N_{wait}$ are the numbers of register bits used by GPU 800, RPUs 802, and WPUs 804, respectively. In an exemplary embodiment, the three register bit numbers are given by:

$$N_{global}=2*SCW+TCW \quad [2a]$$

$$N_{run}=RPN*(TN+3*SCW+7*TCW) \quad [2b]$$

$$N_{wait}=WPN*(TW+WCN*5+WCN*SCW) \quad [2c]$$

wherein TN is the total number of threads, TW is the thread number width $\log_2$(TN), and the other variables are listed in Table 6.

As Eqs. 1 and 2a-c illustrate, the total number of thread profiling register bits can become quite large if large numbers of RPUs 802 and/or WPUs 804 are used. An exemplary compromise between thread profiling completeness and required register size is to use two RPUs 802 (RPN=2) and three WPUs 804 (WPN=3), each with two wait state counters (WCN=2). If MMU 26 runs at a frequency on the order of hundreds of MHz, and if a profiling time on the order of tenths of a second is sufficient to acquire profiling data, it may be sufficient to use 24-bit state counters (SCW=24) and 16-bit transition counters (TCW=16). For a system using 12 threads (TN=12, TW=4), the number of profiling register bits given by Eqs. 1 and 2a-c is 642, which translates to about 13,000 equivalent 2-input NAND gates. A more basic thread profiler could use RPN=1, WPN=2, WCN=2, SCW=20, TCW=12; for 12 threads, the number of thread profiling register bits is 316, which translates to about 6,500 equivalent 2-input NAND gates.

The exemplary thread control systems and methods described above allow relatively fast context switching and efficient thread synchronization. Relatively frequent context switching can be performed without significantly affecting system performance. In some embodiments, a multithreading system call can be executed in one or a few clock cycles. Increasing the efficiency of context switching and interthread communication in the multithreaded microcontroller can allow a better utilization of the processing power of relatively-efficient special-purpose hardware cores (hardware acceleration blocks) operating under the control of the multithreaded microcontroller. The described thread profiling systems and methods allow for improved characterization of the multithreading performance of the microcontroller, and provide information that can be useful in the development of software code for the microcontroller.

It will be clear to one skilled in the art that the above embodiments may be altered in many ways without departing from the scope of the invention. For example, a data processing system may include more than one multithreaded microcontroller. Any register fields or flags described above as implemented using a single bit can be implemented using a larger number of bits. Various described method steps can be performed in different orders than the exemplary step orders illustrated above. Accordingly, the scope of the invention should be determined by the following claims and their legal equivalents.

What is claimed is:

1. A multithreaded microcontroller comprising:
   a set of special-purpose multithreading registers including a set of thread state registers storing a plurality of thread states for a corresponding plurality of threads;
   thread control logic connected to the set of multithreading registers, comprising:
      thread state transition logic connected to the set of thread state registers and configured to control thread state transitions for the plurality of threads; and
      thread instructions execution logic connected to the set of thread state registers and configured to execute a set of multithreading system call machine code instructions; and
   a hardware thread profiler connected to the set of multithreading registers, the thread profiler comprising thread profiling logic configured to collect thread profiling data for the plurality of threads, the thread profiling data comprising at least one datum selected from a group consisting of a set of state transition counts, an amount of time spent by a thread in a subset of thread states, and a set of thread priority raise counts.

2. The multithreaded microcontroller of claim 1, wherein:
   the set of multithreading registers further includes a plurality of thread register sets;
   each thread register set corresponds to a thread from the plurality of threads; and
   said each thread register set comprises a thread priority field identifying a priority of the thread.

3. The multithreaded microcontroller of claim 2, wherein said each thread register set comprises a mutex field identifying a mutex locked by the thread.

4. The multithreaded microcontroller of claim 2, wherein said each thread register set comprises a condition variable field identifying a condition variable the thread is waiting on.

5. The multithreaded microcontroller of claim 1, wherein the set of multithreading registers further includes a global configuration register identifying a maximum number of threads, a maximum number of mutexes, a maximum number of condition variables, and a maximum number of priorities supported by the microcontroller.

6. The multithreaded microcontroller of claim 5, wherein the set of multithreading registers further includes a global mutex lock register comprising a plurality of mutex lock fields each identifying a locking state of a corresponding mutex from a plurality of mutexes.

7. The multithreaded microcontroller of claim 1, wherein the set of multithreading registers further includes a microcontroller main state register comprising:
   a call code field identifying a type for an event that has caused an entry into a system thread; and
   a calling thread identification field identifying a calling thread causing the entry into the system thread.

8. The multithreaded microcontroller of claim 7, wherein the microcontroller main state register further comprises a trap code field identifying an opcode for the event that has caused the entry into the system thread.

9. The multithreaded microcontroller of claim 1, wherein the set of multithreading registers comprises a plurality of mutex registers storing a plurality of mutex states for a corresponding plurality of mutexes.

10. The multithreaded microcontroller of claim 1, wherein the set of multithreading registers comprises a plurality of condition variable registers storing a plurality of condition states for a corresponding plurality of condition variables.

11. The multithreaded microcontroller of claim 1, wherein the plurality of processing threads comprises a plurality of processing threads, and a system thread non-interruptible by the processing threads.

12. The multithreaded microcontroller of claim 1, wherein the thread state transition logic comprises logic configured to:
   transition a state of a thread from a ready state to a run state when the thread is scheduled for execution;
   transition the state of the thread from the run state to an interrupt wait state when the thread receives an interrupt;
   transition the state of the thread from the run state to a condition wait state when the thread executes a wait condition instruction;
   transition the state of the thread from the run state to a mutex wait state when the thread executes a lock mutex instruction;
   transition the state of the thread from the run state to an wait instruction cache state when the thread receives an instruction cache miss signal; and
   transition the state of the thread from the run state to a wait memory state when the thread receives a data miss signal.

13. The multithreaded microcontroller of claim 1, wherein the thread instructions execution logic comprises mutex locking logic configured to execute a set of mutex locking instructions.

14. The multithreaded microcontroller of claim 13, wherein the set of mutex locking instructions comprises a committed lock mutex instruction.

15. The multithreaded microcontroller of claim 14, wherein executing the committed lock mutex instruction comprises checking a mutex register to determine whether a mutex identified by the committed lock mutex instruction is locked by a thread executing the committed lock mutex instruction.

16. The multithreaded microcontroller of claim 15, wherein executing the committed lock mutex instruction further comprises:
   when the mutex identified by the committed lock mutex instruction is not locked by a thread executing the committed lock mutex instruction, checking a thread priority register to compare a priority of the thread executing the committed lock mutex instruction to a priority of a thread holding a lock of the mutex identified by the committed lock mutex instruction; and
   when the priority of the thread executing the committed lock mutex instruction is higher than the priority of the thread holding the lock, increasing the priority of the thread holding the lock to at least the priority of the thread executing the committed lock mutex instruction.

17. The multithreaded microcontroller of claim 14, wherein the set of mutex locking instructions further comprises a test mutex instruction.

18. The multithreaded microcontroller of claim 17, wherein executing the test mutex instruction comprises checking a mutex register to determine whether a mutex identified by the test mutex instruction is locked by a thread executing the test mutex instruction.

19. The multithreaded microcontroller of claim 17, wherein the set of mutex locking instructions further comprises an unlock mutex instruction.

20. The multithreaded microcontroller of claim 13, wherein the set of mutex locking instructions comprises an unlock mutex instruction, and wherein executing the unlock mutex instruction comprises checking a mutex register to determine whether a mutex identified by the unlock mutex instruction is locked by a thread executing the unlock mutex instruction.

21. The multithreaded microcontroller of claim 20, wherein executing the unlock mutex instruction further comprises:
 determining whether a set of threads other than the thread executing the unlock mutex instruction are waiting for the mutex identified by the unlock mutex instruction; and
 when the set of threads other than the thread executing the unlock mutex instruction are waiting for the mutex identified by the unlock mutex instruction, selecting a highest-priority thread from the set of threads other than the thread executing the unlock mutex instruction, and setting a priority of the highest-priority thread at least as high as a priority of the thread executing the unlock mutex instruction.

22. The multithreaded microcontroller of claim 21, wherein executing the unlock mutex instruction further comprises:
 when the set of threads other than the thread executing the unlock mutex instruction are waiting for the mutex identified by the unlock mutex instruction, determining a highest priority among a set of threads waiting for any mutex held by the thread executing the unlock mutex instruction; and
 setting the priority of the thread executing the unlock mutex instruction at least as high as the highest priority among the set of threads waiting for any mutex held by the thread executing the unlock mutex instruction.

23. The multithreaded microcontroller of claim 1, wherein the thread instructions execution logic comprises wait condition logic configured to execute a wait condition instruction.

24. The multithreaded microcontroller of claim 23, wherein executing the wait condition instruction comprises checking a mutex register to determine whether a mutex identified by the wait condition instruction is locked by a thread executing the wait condition instruction.

25. The multithreaded microcontroller of claim 23, wherein executing the wait condition instruction comprises transitioning a state of a thread executing the wait condition instruction from a run state to a condition wait state.

26. The multithreaded microcontroller of claim 1, wherein the thread instructions execution logic comprises condition signal logic configured to execute a condition signal instruction.

27. The multithreaded microcontroller of claim 25, wherein executing the condition signal instruction comprises transitioning a state of a thread waiting for a condition signal from a condition wait state to a ready state.

28. The multithreaded microcontroller of claim 1, further comprising thread scheduling logic connected to the set of multithreading registers and configured to schedule the plurality of threads for execution according to the plurality of thread states and a corresponding plurality of thread priorities.

29. The multithreaded microcontroller of claim 1, wherein the thread profiling data includes the set of state transition counts.

30. The multithreaded microcontroller of claim 1, wherein the thread profiling data includes the amount of time spent by the thread in the subset of thread states.

31. The multithreaded microcontroller of claim 1, wherein the thread profiling data includes of thread priority raise counts.

32. The multithreaded microcontroller of claim 1, wherein the thread profiling data includes a set of wait state counts.

33. The multithreaded microcontroller of claim 1, wherein the thread profiler comprises:
 a set of thread run profiling units configured to collect run profiling data for the plurality of threads; and
 a set of thread wait profiling units configured to collect wait profiling data for the plurality of threads.

34. The multithreaded microcontroller of claim 1, wherein the set of multithreading registers comprises a set of thread profiling registers configured to store thread profiling data for the plurality of threads.

35. The multithreaded microcontroller of claim 1, wherein the set of multithreading registers further includes a thread hardware execution mask register configured to store a thread hardware execution mask corresponding to the set of multithreading system call machine code instructions, the thread hardware execution mask identifying a subset of multithreading system call instructions to be executed in hardware by the thread instructions execution logic, and a subset of multithreading system call instructions to be executed in software by a system thread.

36. The multithreaded microcontroller of claim 1, further comprising an instruction fetching unit connected to the thread control logic and configured to receive a set of machine-code instructions for the plurality of threads, the set of machine-code instructions including a set of arithmetic and logical instructions, and the set of multithreading system call instructions.

37. The multithreaded microcontroller of claim 36, wherein the set of instructions includes a set of conditional jump instruction, wherein at least one conditional jump instruction immediately follows and is conditioned on an outcome of a multithreading system call instruction.

38. The multithreaded microcontroller of claim 1, wherein the set of multithreading registers comprises a set of flag registers storing a set of flags reflecting an outcome of an execution of a latest multithreading system call machine code instruction.

39. The multithreaded microcontroller of claim 38, wherein the set of flags comprise at least one condition flag defining a condition for a conditional jump instruction immediately following the latest multithreading system call machine code instruction.

40. A multithreaded data processing method comprising:
 storing a plurality of thread states for a corresponding plurality of threads in a set of thread state registers;
 controlling thread state transitions for the plurality of threads using thread state transition logic connected to the set of thread state registers;
 executing a set of multithreading system call machine code instructions using thread instructions execution logic connected to the set of thread state registers; and
 collecting thread profiling data for the plurality of threads using a hardware thread profiler connected to the set of thread state registers, the thread profiling data comprising at least one datum selected from a group consisting of a set of state transition counts, an amount of time spent by a thread in a subset of thread states, and a set of thread priority raise counts.

41. The multithreaded data processing method of claim 40, further comprising:
   transitioning a state of a thread from a ready state to a run state when the thread is scheduled for execution;
   transitioning the state of the thread from the run state to an interrupt wait state when the thread receives an interrupt;
   transitioning the state of the thread from the run state to a condition wait state when the thread executes a wait condition instruction;
   transitioning the state of the thread from the run state to a mutex wait state when the thread executes a lock mutex instruction;
   transitioning the state of the thread from the run state to an wait instruction cache state when the thread receives an instruction cache miss signal; and
   transitioning the state of the thread from the run state to a wait memory state when the thread receives a data miss signal.

42. The multithreaded data processing method of claim 40, wherein the set of multithreading system call machine code instructions includes a set of mutex locking instructions.

43. The multithreaded data processing method of claim 42, wherein the set of mutex locking instructions comprises a committed lock mutex instruction.

44. The multithreaded data processing method of claim 43, wherein executing the committed lock mutex instruction comprises checking a mutex register to determine whether a mutex identified by the committed lock mutex instruction is locked by a thread executing the committed lock mutex instruction.

45. The multithreaded data processing method of claim 44, wherein executing the committed lock mutex instruction further comprises:
   when the mutex identified by the committed lock mutex instruction is not locked by a thread executing the committed lock mutex instruction, checking a thread priority register to compare a priority of the thread executing the committed lock mutex instruction to a priority of a thread holding a lock of the mutex identified by the committed lock mutex instruction; and
   when the priority of the thread executing the committed lock mutex instruction is higher than the priority of the thread holding the lock, increasing the priority of the thread holding the lock to at least the priority of the thread executing the committed lock mutex instruction.

46. The multithreaded data processing method of claim 43, wherein the set of mutex locking instructions further comprises a test mutex instruction.

47. The multithreaded data processing method of claim 46, wherein executing the test mutex instruction comprises checking a mutex register to determine whether a mutex identified by the test mutex instruction is locked by a thread executing the test mutex instruction.

48. The multithreaded data processing method of claim 46, wherein the set of mutex locking instructions further comprises an unlock mutex instruction.

49. The multithreaded data processing method of claim 42, wherein the set of mutex locking instructions comprises an unlock mutex instruction, and wherein executing the unlock mutex instruction comprises checking a mutex register to determine whether a mutex identified by the unlock mutex instruction is locked by a thread executing the unlock mutex instruction.

50. The multithreaded data processing method of claim 49, wherein executing the unlock mutex instruction further comprises:
   determining whether a set of threads other than the thread executing the unlock mutex instruction are waiting for the mutex identified by the unlock mutex instruction; and
   when the set of threads other than the thread executing the unlock mutex instruction are waiting for the mutex identified by the unlock mutex instruction, selecting a highest-priority thread from the set of threads other than the thread executing the unlock mutex instruction, and setting a priority of the highest-priority thread at least as high as a priority of the thread executing the unlock mutex instruction.

51. The multithreaded data processing method of claim 50, wherein executing the unlock mutex instruction further comprises:
   when the set of threads other than the thread executing the unlock mutex instruction are waiting for the mutex identified by the unlock mutex instruction, determining a highest priority among a set of threads waiting for any mutex held by the thread executing the unlock mutex instruction; and
   setting the priority of the thread executing the unlock mutex instruction at least as high as the highest priority among the set of threads waiting for any mutex held by the thread executing the unlock mutex instruction.

52. The multithreaded data processing method of claim 40, wherein the set of multithreading system call machine code instructions includes a wait condition instruction.

53. The multithreaded data processing method of claim 52, wherein executing the wait condition instruction comprises checking a mutex register to determine whether a mutex identified by the wait condition instruction is locked by a thread executing the wait condition instruction.

54. The multithreaded data processing method of claim 52, wherein executing the wait condition instruction comprises transitioning a state of a thread executing the wait condition instruction from a run state to a condition wait state.

55. The multithreaded data processing method of claim 40, wherein the set of multithreading system call machine code instructions includes a condition signal instruction.

56. The multithreaded data processing method of claim 55, wherein executing the condition signal instruction comprises transitioning a state of a thread waiting for a condition signal from a condition wait state to a ready state.

57. The multithreaded data processing method of claim 40, further comprising scheduling the plurality of threads for execution according to the plurality of thread states and a corresponding plurality of thread priorities.

58. The multithreaded data processing method of claim 40, wherein the thread profiling data includes the set of state transition counts.

59. The multithreaded data processing method of claim 40, wherein the thread profiling data includes the amount of time spent by the thread in the subset of thread states.

60. The multithreaded data processing method of claim 40, wherein the thread profiling data includes the set of thread priority raise counts.

61. The multithreaded data processing method of claim 40, wherein the thread profiling data includes a set of wait state counts.

62. The multithreaded data processing method of claim 40 further comprising:
collecting run profiling data for the plurality of threads using a set of thread run profiling units; and
collecting wait profiling data for the plurality of threads using a set of thread wait profiling units.

63. The multithreaded data processing method of claim 40, further comprising storing the thread profiling data in a set of thread profiling registers.

64. The multithreaded data processing method of claim 40, further comprising storing a thread hardware execution mask corresponding to the set of multithreading system call machine code instructions in a thread hardware execution mask register, the thread hardware execution mask identifying a subset of multithreading system call instructions to be executed in hardware by the thread instructions execution logic, and a subset of multithreading system call instructions to be executed in software by a system thread.

65. The multithreaded data processing method of claim 40, further comprising fetching a set of machine-code instructions for the plurality of threads, the set of machine-code instructions including a set of arithmetic and logical instructions, and the set of multithreading system call instructions.

66. The multithread data processing method of claim 65, wherein the set of instructions includes a set of conditional jump instructions, wherein at least one conditional jump instruction immediately follows and is conditioned on an outcome of a multithreading system call instruction.

67. The multithreaded data processing method of claim 40, further comprising storing a set of flags reflecting an outcome of an execution of a latest multithreading system call machine code instruction in a set of flag registers.

68. The multithreading data processing method of claim 67, wherein the set of flags comprise at least one condition flag defining a condition for a conditional jump instruction immediately following the latest multithreading system call machine code instruction.

69. A multithreaded microcontroller comprising:
an instruction fetching unit configured to receive a set of machine-code instructions for a plurality of threads, the set of instructions including a set of arithmetic and logical instructions, and a set of multithreading system call instructions;
an arithmetic logic unit connected to the instruction fetching unit and configured to receive and execute the set of arithmetic and logical instructions; and
a hardware thread controller connected to the instruction fetching unit and the arithmetic logic unit, configured to receive and execute the set of multithreading system call instructions, wherein the thread controller comprises a hardware thread profiler the thread profiler configured to collect thread profiling data for the plurality of threads, the thread profiling data comprising at least one datum selected from a group consisting of a set of state transition counts, an amount of time spent by a thread in a subset of thread states, and a set of thread priority raise counts.

70. The multithreaded microcontroller of claim 69, wherein the set of multithreading system calls comprises a mutex locking instruction, and the thread control logic comprises mutex locking execution logic configured to execute the mutex locking instruction.

71. The multithreaded microcontroller of claim 70, wherein the mutex locking instruction is a committed lock mutex instruction.

72. The multithreaded microcontroller of claim 70, wherein the mutex locking instruction is a test mutex instruction.

73. The multithreaded microcontroller of claim 70, wherein the mutex locking instruction is an unlock mutex instruction.

74. The multithreaded microcontroller of claim 69, wherein the set of multithreading system calls comprises a wait condition instruction, and the thread control logic comprises wait condition execution logic configured to execute the wait condition instruction.

75. The multithreaded microcontroller of claim 69, wherein the set of multithreading system calls comprises a condition signal instruction, and the thread control logic comprises condition signal execution logic configured to execute the condition signal instruction.

76. The multithreaded microcontroller of claim 69, wherein the thread controller comprises thread state transition logic configured to control a set of thread state transitions.

77. The multithreaded microcontroller of claim 69, wherein the thread controller comprises thread scheduling logic configured to schedule a plurality of threads according to the thread states and a corresponding plurality of thread priorities.

78. The multithreaded microcontroller of claim 69, wherein the thread profiling data includes the set of state transition counts.

79. The multithreaded microcontroller of claim 69, wherein the thread profiling data includes the amount of time spent by a thread in a subset of thread states.

80. The multithreaded microcontroller of claim 69, wherein the thread profiling data includes a set of thread priority raise counts.

81. The multithreaded microcontroller of claim 69, wherein the thread profiling data includes a set of wait state counts.

82. A data processing apparatus comprising:
a plurality of special-purpose hardware cores integrated on a chip; and
a multithreaded microcontroller integrated on the chip and connected to the plurality of cores, the microcontroller controlling a plurality of threads including a first thread communicating with a first core and a second thread communicating with a second core, the multithreaded microcontroller including
a set of special-purpose multithreading registers including a set of thread state registers storing a plurality of thread states for the plurality of threads; and
thread control logic connected to the set of multithreading registers, comprising:
thread state transition logic connected to the set of thread state registers and configured to control thread state transitions for the plurality of threads;
thread instructions execution logic connected to the thread state transition logic and configured to execute a set of multithreading system call machine code instructions; and
a hardware thread profiler connected to the set of multithreading registers, the thread profiler comprising thread profiling logic configured to collect thread profiling data for the plurality of threads, the thread profiling data comprising at least one datum selected from a group consisting of a set of state transition counts, an amount of time spent by a thread subset of thread states, and a set of thread priority raise counts.

83. The data processing apparatus of claim 82, wherein:

the plurality of cores includes at least one video coding core and at least one audio coding core;

the plurality of threads including a video coding thread communicating with the video coding core and an audio coding thread communicating with the audio coding core.

84. A data processing apparatus comprising:

a multithreaded instruction execution unit configured to run a plurality of threads; and a hardware thread profiler connected to the multithreaded instruction execution unit, the thread profiler comprising:

thread profiling logic configured to collect thread profiling data for the plurality of threads, the thread profiling data comprising at least one datum selected from a thread state transition count a time period spent by a thread in a set of thread states, and a set of priority raise counts; and a set of thread profiling registers connected to the thread profiling logic and storing the thread profiling data.

85. The data processing apparatus of claim 84, wherein the thread profiling data includes a set of state transition counts.

86. The data processing apparatus of claim 84, wherein the thread profiling data includes the amount of time spent by the thread in the set of thread states.

87. The data processing apparatus of claim 84, wherein the thread profiling data includes the set of thread priority raise counts.

88. The data processing apparatus of claim 84, wherein the thread profiling data includes a set of wait state counts.

89. The data processing apparatus of claim 84, wherein the thread profiler comprises:

a set of thread run profiling units configured to collect run profiling data for the plurality of threads; and a set of thread wait profiling units configured to collect wait profiling data for the plurality of threads.

90. The data processing apparatus of claim 89, wherein the set of thread profiling registers includes:

a set of run profiling registers storing a set of thread run profiling data for the plurality of threads; and a set of wait profiling registers storing a set of thread wait profiling data for the plurality of threads.

91. A data processing apparatus comprising:

a set of special-purpose multithreading registers including a set of thread state registers storing a plurality of thread states for a corresponding plurality of threads;

a set of mutex registers storing a plurality of mutex states for a corresponding plurality of mutexes; and a set of condition variable registers storing a plurality of condition variable states for a corresponding plurality of condition variables;

thread control logic connected to the set of multithreading registers, comprising:

thread state transition logic connected to the set of thread state registers and configured to control thread state transitions for the plurality of threads; and thread instructions execution logic connected to the thread state transition logic and configured to execute a set of multithreading system call machine code instructions, the thread instructions execution logic comprising mutex locking logic connected to the set of mutex registers and configured to execute a set of mutex locking instructions according to the set of mutex states, and wait condition logic connected to the set of mutex registers configured to execute a wait condition instruction according to the set of mutex states and the set of condition variable states; and a hardware thread profiler connected to the set of multithreading registers, the thread profiler comprising thread profiling logic configured to collect thread profiling data for the plurality of threads, the thread profiling data comprising at least one datum selected from a group consisting of a set of state transition counts, an amount of time spent by a thread in a subset of thread states, and a set of thread priority raise counts.

* * * * *